(12) United States Patent
Satoh

(10) Patent No.: US 12,316,949 B2
(45) Date of Patent: May 27, 2025

(54) IMAGING APPARATUS, CAPABLE OF ADJUSTING DISPLACEMENT OF A RECORDING REGION, DISPLAY DEVICE, CONTROL METHOD OF IMAGING APPARATUS, AND IMAGING SYSTEM

(71) Applicant: CANON KABUSHIKI KAISHA, Tokyo (JP)

(72) Inventor: Masahiro Satoh, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 199 days.

(21) Appl. No.: 18/179,102

(22) Filed: Mar. 6, 2023

(65) Prior Publication Data

US 2023/0300449 A1 Sep. 21, 2023

(30) Foreign Application Priority Data

Mar. 15, 2022 (JP) ................. 2022-040654

(51) Int. Cl.
*H04N 23/611* (2023.01)
*H04N 7/18* (2006.01)
*H04N 23/60* (2023.01)
*H04N 23/80* (2023.01)

(52) U.S. Cl.
CPC .......... *H04N 23/611* (2023.01); *H04N 7/183* (2013.01); *H04N 23/64* (2023.01); *H04N 23/80* (2023.01)

(58) Field of Classification Search
CPC ...... H04N 23/611; H04N 7/183; H04N 23/64; H04N 23/80; H04N 23/698; H04N 17/002; H04N 23/62; H04N 23/661; H04N 5/2628

USPC ..................................... 348/333.04
See application file for complete search history.

(56) References Cited

U.S. PATENT DOCUMENTS

| | | | |
|---|---|---|---|
| 8,723,888 B2 * | 5/2014 | Cudalbu | G01C 21/367 701/445 |
| 10,354,404 B2 * | 7/2019 | Kuznetsov | B60R 1/31 |
| 2006/0244820 A1 * | 11/2006 | Morita | G06T 19/006 348/14.13 |
| 2010/0328344 A1 * | 12/2010 | Mattila | G06F 3/04815 345/158 |

(Continued)

FOREIGN PATENT DOCUMENTS

| JP | 2015-153302 A | 8/2015 |
|---|---|---|
| JP | 2016-110489 A | 6/2016 |

*Primary Examiner* — Usman A Khan
(74) *Attorney, Agent, or Firm* — Cowan, Liebowitz & Latman, P.C.

(57) ABSTRACT

An imaging apparatus includes an imaging unit; a detection unit configured to detect a posture of a head region of a user with respect to the imaging apparatus; a decision unit configured to decide, on the basis of the posture of the head region detected by the detection unit, a recording region to be clipped from a range of imaging by the imaging unit; a determination unit configured to determine whether or not a displacement of the recording region in the imaging range is to be adjusted; and a notification unit configured to transmit, in a case where it is determined by the determination unit that the displacement of the recording region is to be adjusted, a notification that encourages the adjustment of the displacement of the recording region to a display device that displays information related to the displacement of the recording region.

20 Claims, 17 Drawing Sheets

(56) References Cited

U.S. PATENT DOCUMENTS

| | | | | |
|---|---|---|---|---|
| 2012/0120103 A1* | 5/2012 | Border | ................ | G02B 27/017 |
| | | | | 345/633 |
| 2013/0194164 A1* | 8/2013 | Sugden | .................... | G06T 7/12 |
| | | | | 345/8 |
| 2014/0002495 A1* | 1/2014 | Lamb | .................... | G09G 3/003 |
| | | | | 345/633 |
| 2014/0267868 A1* | 9/2014 | Mazzola | .............. | H04N 23/635 |
| | | | | 348/333.02 |
| 2022/0382065 A1* | 12/2022 | Kimura | .............. | G02B 27/0179 |

\* cited by examiner

IMAGING APPARATUS, CAPABLE OF ADJUSTING DISPLACEMENT OF A RECORDING REGION, DISPLAY DEVICE, CONTROL METHOD OF IMAGING APPARATUS, AND IMAGING SYSTEM

BACKGROUND OF THE INVENTION

Field of the Invention

The present invention relates to an imaging apparatus, a display device, a control method of the imaging apparatus, and an imaging system.

Description of the Related Art

When performing imaging with a hand-held camera, a photographer performs operations such as imaging with the camera being pointed in a direction of imaging, and consequently it is difficult for the photographer to use his or her hands for anything other than imaging behavior or focus on something other than the imaging to experience the realism of being there.

For example, it is difficult for the photographer who intends to image a child to hold the child during imaging or image the child while holding the child. Meanwhile, a photographer who is watching a sports game may not pay attention to cheering and may not remember details of the game, or may concentrate on watching the sports game and stop imaging. Even in a group trip, when the photographer concentrates on imaging, he or she will not experience the same level of excitement as that experienced by the other members while, when the experience is prioritized, the photographer will neglect the imaging.

Accordingly, by imaging a wide range with an omnidirectional camera and clipping and editing an intended image portion from a captured omnidirectional image, the photographer is allowed to focus on experience during the experience and also leave what is experienced in the captured image. However, the editing of the omnidirectional image involves a series of tasks such as image conversion and clipped region specification, and is therefore complicated.

It can be considered to detect a line-of-sight position during imaging and automatically determine a region to be clipped on the basis of the detected line-of-sight position, but the detection of the line-of-sight position may incur an error due to individual differences, a positional relationship with a sensor, or the like. To correct the error in the detection of the line-of-sight position, various calibration processing has been proposed.

Japanese Patent Application Publication No. 2016-110489 discloses processing of displaying an AR image at a position on a display corresponding to a predetermined reference position, and performing calibration by using, as a reference direction, a direction when the AR image is viewed in superimposed relation on the reference position.

Japanese Patent Application Publication No. 2015-153302 discloses processing of displaying an image on a display control apparatus in which a camera that detects a line of sight of a user is mounted, displaying a plurality of set positions on the image, and performing calibration of the line of sight on the basis of lines of sight gazing at the set positions.

However, even though the calibration processing is performed before imaging, a positional relationship between the apparatus that detects the line of sight and the photographer may change during the imaging to cause deviation in calibration settings. When no consideration is given to the deviation caused in the calibration settings during the imaging, it is difficult to appropriately clip the region viewed by the user from the omnidirectional image.

SUMMARY OF THE INVENTION

The present invention provides a technology for reducing deviation in calibration settings.

An imaging apparatus according to the present invention includes at least one memory and at least one processor which function as: an imaging unit; a detection unit configured to detect a posture of a head region of a user with respect to the imaging apparatus; a decision unit configured to decide, on the basis of the posture of the head region detected by the detection unit, a recording region to be clipped from a range of imaging by the imaging unit; a determination unit configured to determine whether or not a displacement of the recording region in the imaging range is to be adjusted; and a notification unit configured to transmit, in a case where it is determined by the determination unit that the displacement of the recording region is to be adjusted, a notification that encourages the adjustment of the displacement of the recording region to a display device that displays information related to the displacement of the recording region.

Further features of the present invention will become apparent from the following description of exemplary embodiments with reference to the attached drawings.

DESCRIPTION OF THE EMBODIMENTS

Embodiment

Figure 1:
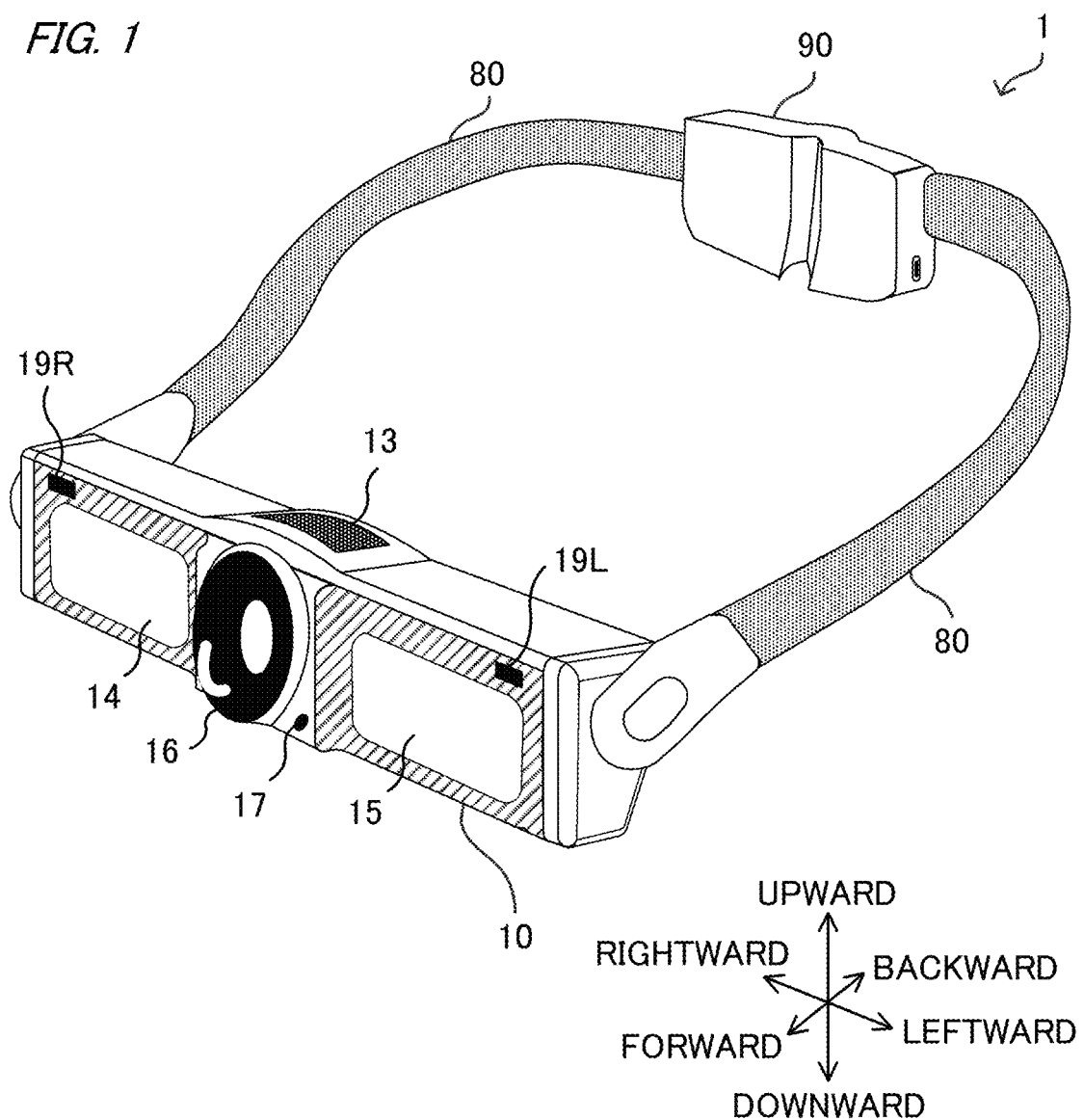
FIG. 1 is an appearance view of a camera according to an embodiment.

Referring to the drawings, the following will describe an embodiment of the present invention. FIG. 1 is an appearance view of a camera 1 according to the embodiment. FIG. 1 illustrates the appearance view of the camera 1 as an example of an imaging apparatus to which the present invention is applicable. In FIG. 1, the camera 1 includes a photographing/detection unit 10, a battery unit 90, and a connection portion 80 connecting the photographing/detection unit 10 and the battery unit 90.

The photographing/detection unit 10 includes a face direction detection window 13, a start switch 14, a stop switch 15, an imaging lens 16, an LED 17, and microphones 19L and 19R. The face direction detection window 13 transmits an infrared ray projected from an infrared LED lighting circuit 21 (FIG. 10) embedded in the photographing/detection unit 10 to detect a position of each of face parts of a user (photographer or user) and a reflected light ray thereof. The start switch 14 is a switch for starting imaging. The stop switch 15 is a switch for stopping the imaging.

The imaging lens 16 guides an imaging light ray to a solid-state image sensor 42 (FIG. 10) within the photographing/detection unit 10. The LED 17 is an LED that notifies that the imaging is being performed or gives a warning. The microphones 19R and 19L are microphones that pick up ambient sounds, and the microphone 19L picks up a sound on a left side (a right side of FIG. 1) of the surrounding of the user, while the microphone 19R picks up a sound on a right side (a left side of FIG. 1) of the surrounding of the user.

Figure 2:
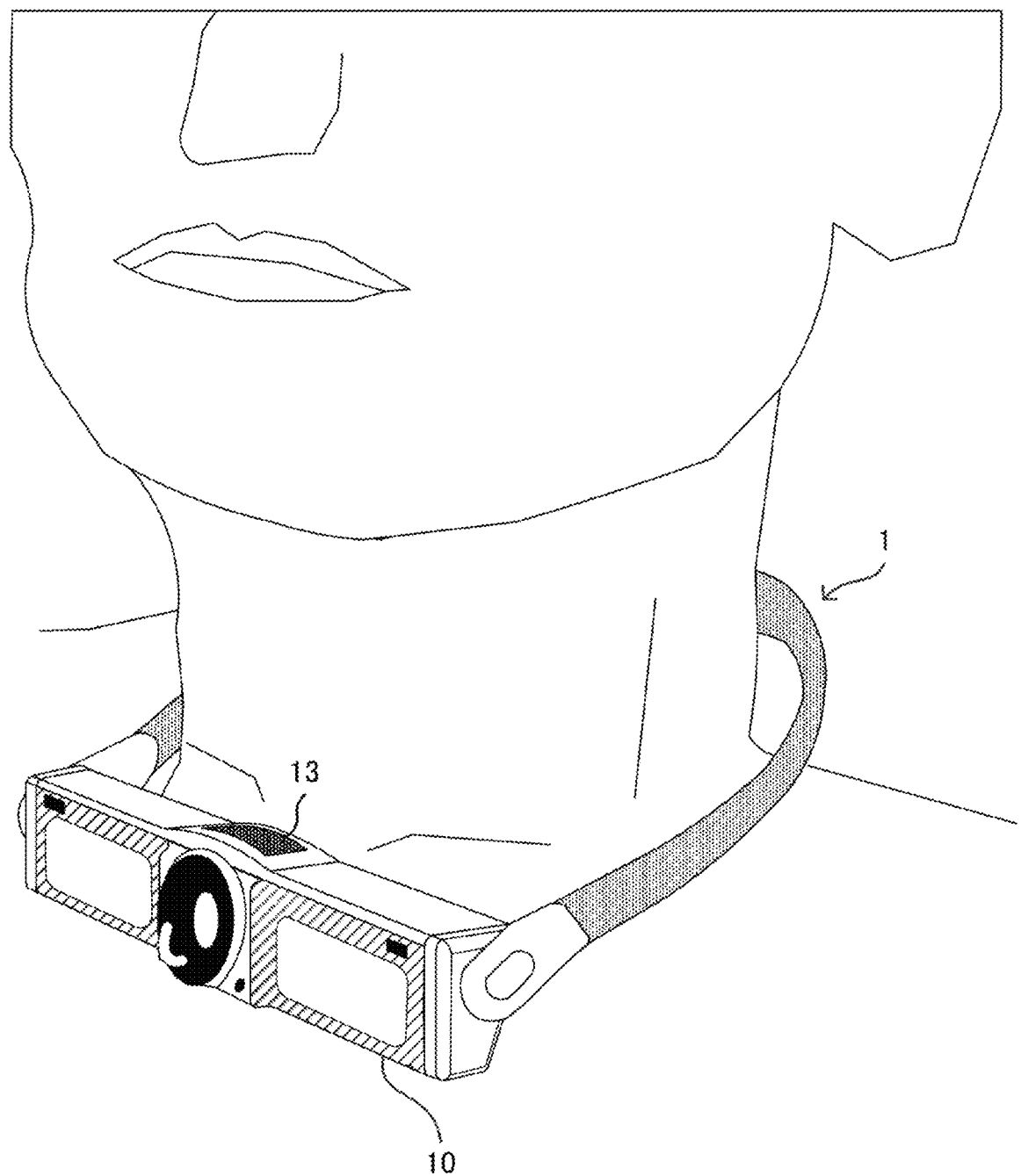
FIG. 2 is a diagram illustrating a state where a user is wearing the camera.

FIG. 2 is a diagram illustrating a state where the user is wearing the camera 1. When the camera 1 is worn such that the battery unit 90 comes to a back side of the user and the photographing/detection unit 10 comes to a front side of a body of the user, the photographing/detection unit 10 is biased in a direction of a chest of the user by the connection portion 80 having both ends connected to the vicinities of left and right end portions to be supported. As a result, the photographing/detection unit 10 is located approximately in front of a clavicle of the user.

When the user wears the camera 1, the face direction detection window 13 is located under a jaw of the user. Within the face direction detection window 13, an infrared ray condensing lens 26 (FIG. 10) is present. An optical axis (detection optical axis) of the infrared ray condensing lens 26 faces a direction different from that of an optical axis (imaging axis) of the imaging lens 16, and a face direction detection unit 20 (FIG. 10) detects a face direction of the user from respective positions of individual face parts such as a neck, a chin, and a nose. This allows a photographing unit 40 (FIG. 10) to capture an image of the face direction (observation direction) of the user.

Figure 3:
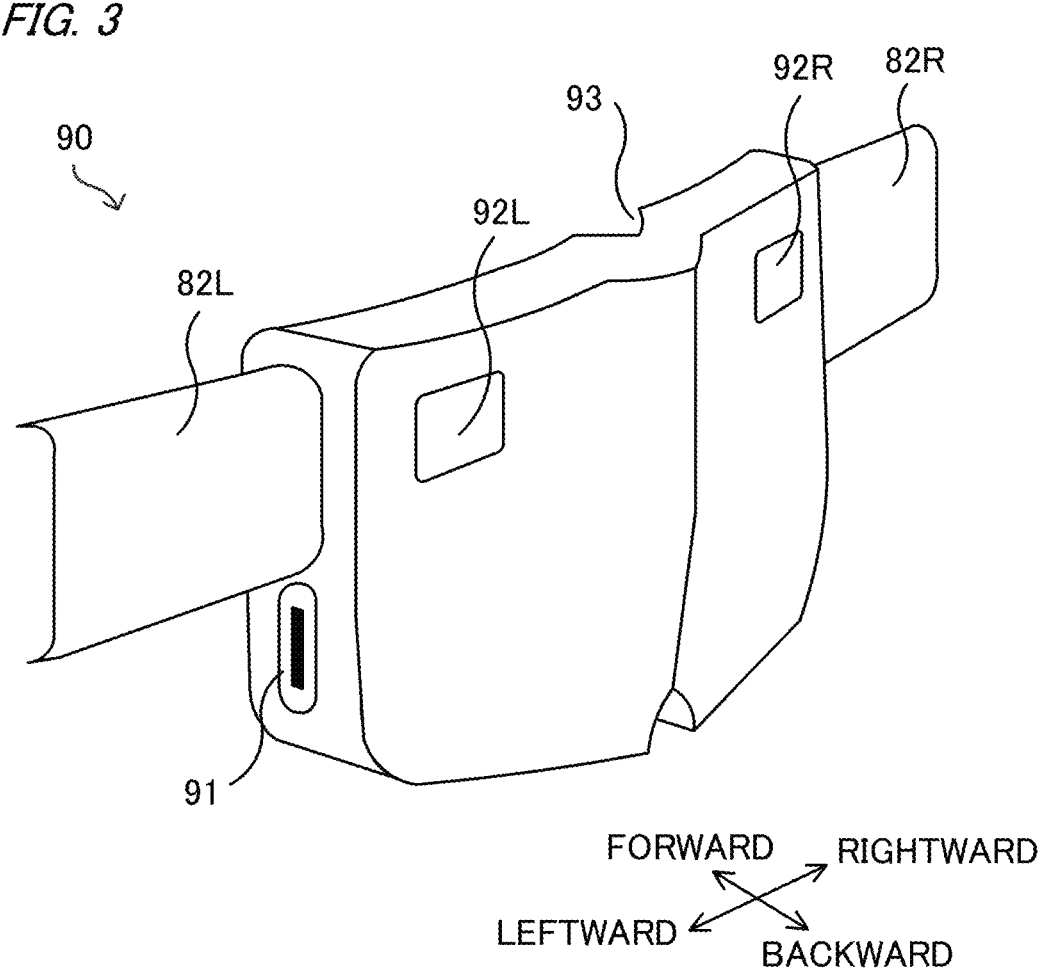
FIG. 3 is a diagram obtained by viewing a battery unit from behind the camera.

FIG. 3 is a diagram obtained by viewing the battery unit 90 from behind the camera 1. In FIG. 3, the battery unit 90 includes a charge cable insertion port 91, adjustment buttons 92L and 92R, and a spine avoidance notch 93. The charge cable insertion port 91 is an insertion port for a charge cable not shown and, via the charge cable, an inner battery is charged from an external power source or power is fed to the photographing/detection unit 10.

The adjustment buttons 92L and 92R are adjustment buttons for respective lengths of band portions 82L and 82R of the connection portion 80. The adjustment button 92L is a button for adjusting the left band portion 82L, while the adjustment button 92R is a button for adjusting the right band portion 82R. Note that, in the example in FIG. 3, the band portions 82L and 82R are adjusted independently with the two adjustment buttons 92L and 92R, but may also be adjusted with one button.

The spine avoidance notch 93 is a notched portion for avoiding a spine portion of the user so as to prevent the battery unit 90 from coming into contact with the spine portion. The spine avoidance notch 93 can reduce wearing discomfort by avoiding a protruded portion of the spine of a human body and prevent a main body from laterally moving during use.

Figure 4:
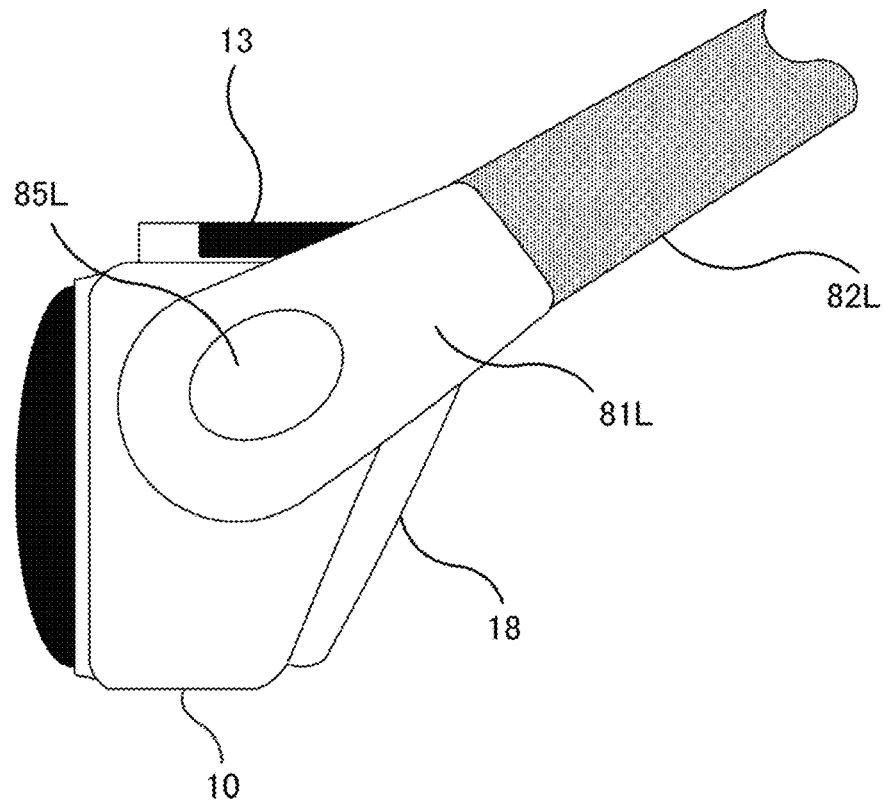
FIG. 4 is a diagram obtained by viewing a photographing/detection unit from a left side surface of the camera.

FIG. 4 is a diagram obtained by viewing the photographing/detection unit 10 from a left side surface of the camera 1. An angle adjustment button 85L is a button provided in an angle holding unit 81L to be used in adjusting an angle of the photographing/detection unit 10. Note that, in an angle holding unit 81R located on a right side surface of the camera 1, an angle adjustment button 85R is provided at a position symmetrical to that of the angle adjustment button 85L, though not illustrated in FIG. 4. The angle holding units 81L and 81R are generally referred to as an angle holding unit 81. The angle adjustment buttons 85L and 85R are generally referred to as an angle adjustment button 85.

The user operates the angle holding unit 81 while pressing the angle adjustment button 85 to be able to change respective angles of the photographing/detection unit 10 and the angle holding unit 81. A protrusion angle of a chest region connection pad 18 can also be changed. By the action of the two angle changing members (the angle adjustment button 85 and the chest region connection pad 18), even when a chest position shape of the user has individual differences, the photographing/detection unit 10 is allowed to adjust a direction of the optical axis of the imaging lens 16 substantially horizontally.

The camera 1 can generate a video by clipping, from the image being captured, a region of the user in the face direction that has been detected via the face direction detection window 13. However, deviation may occur between the optical axis of the camera 1 (the imaging lens 16) worn around the neck and the face direction of the user, and individual differences are also assumed. To appropriately clip a region intended to be imaged by the user, calibration processing of adjusting a position of a region to be clipped with respect to the face direction is preferably performed before imaging.

Figure 5:
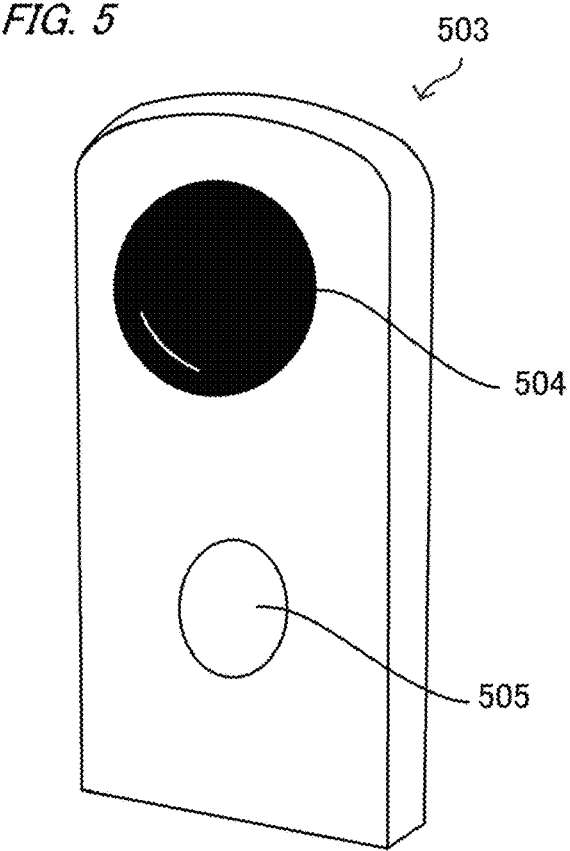
FIG. 5 is an appearance view of an omnidirectional camera.

Referring to FIG. 5 and FIGS. 6A to 6C, a description will be given herein of clipping of a region from an omnidirectional image. FIG. 5 illustrates an example of an omnidirectional camera 503 including a lens 504 and a photographing button 505. The lens 504 is a type of a pair of fish-eye lenses for hemispheric photography which are configured in both surfaces of a casing of the omnidirectional camera 503. The omnidirectional camera 503 uses the pair of fish-eye lenses to perform omnidirectional photography. In other words, by combining together projection images from the pair of fish-eye lenses, omnidirectional photography is performed.

Figure 6A:
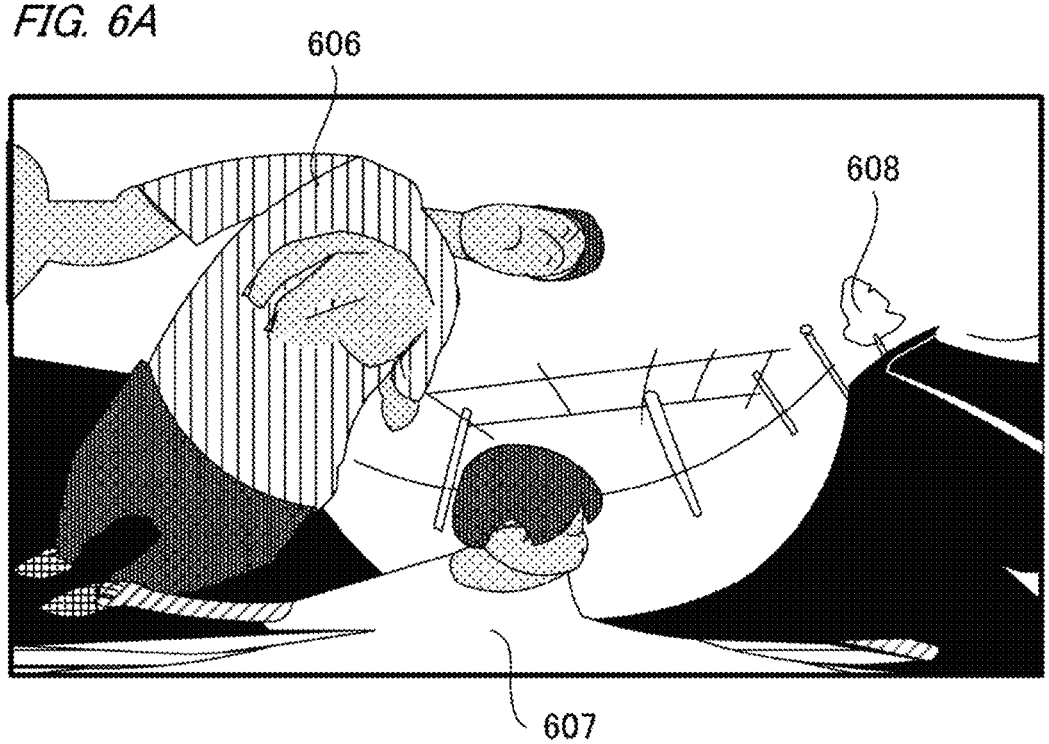
FIGS. 6A to 6C are diagrams illustrating clipping of a region from an omnidirectional image.
Figure 6B:
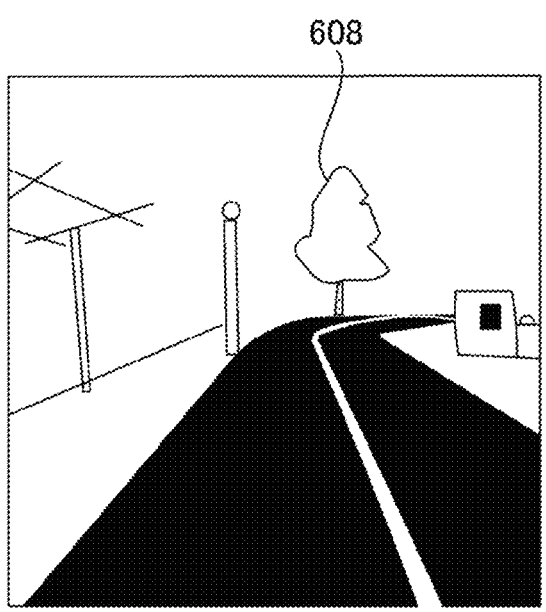
Figure 6C:
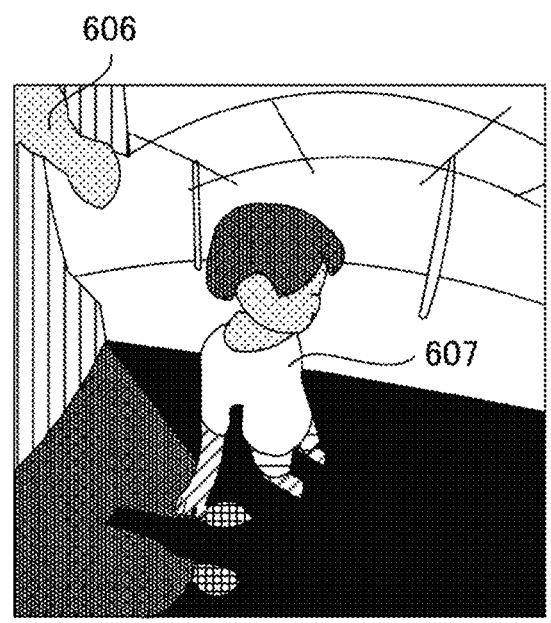

FIGS. 6A to 6C are diagrams illustrating the clipping of the region from the omnidirectional image captured by the omnidirectional camera 503. FIGS. 6B and 6C illustrate an example in which a part of the image captured by the omnidirectional camera 503 is clipped and converted to a planar image.

FIG. 6A illustrates an example of an image obtained by the omnidirectional photographing by the omnidirectional camera 503, and the image includes a photographer 606, a child 607, and a tree 608 each corresponding to a subject. The image illustrated in FIG. 6A is an image in a hemispherical optical system obtained by combining together the projection images from the pair of fish-eye lenses and, accordingly, the photographer 606 is significantly distorted.

The child 607 corresponding to the subject intended to be photographed by the photographer 606 had a trunk region located in a peripheral portion of the hemispherical optical system, and therefore the trunk region is significantly distorted in a lateral direction and stretched. Meanwhile, the tree 608 was the subject located in front of the lens 504, and therefore imaged without significant distortion. By clipping a portion from the image in FIG. 6A and converting the clipped portion to a planar image, it is possible to generate an image in such a visual field as normally viewed by a person.

FIG. 6B illustrates an image obtained by clipping, from the image in FIG. 6A, an image located in front of the lens 504. In the image in FIG. 6B, the tree 608 is seen at a center in such a visual field as normally viewed by a person. Since the child 607 intended to be imaged by the photographer 606 is not included in FIG. 6B, the clipped region is changed. For example, by moving the clipped region leftwardly from the tree 608 and 30° downwardly in the image in FIG. 6A, the clipped region is allowed to include the child 607. FIG. 6C illustrates an image obtained by clipping the region including the child 607 and performing planar conversion.

In a case of performing a task (hereinafter referred to as "trimming") of clipping an intended region after imaging, the photographer can focus on experience on the spot during imaging, but a burden of the trimming task after the imaging increases. Accordingly, the camera 1 specifies a region to be clipped on the basis of the face direction of the user detected via the face direction detection window 13 to thereby reduce the burden of the trimming task. To trim the region intended by the user, calibration processing of adjusting a position of the region to be clipped with respect to the face direction is performed.

The user wearing the camera 1 has an individual difference in physical frame, direction and angle of a periphery of a neck region around which the camera 1 is worn, or clothes condition represented by collars during wearing and an adjustment difference such as an adjustment difference between the band portions 82L and 82R. Consequently, the optical axis of the imaging lens 16 of the camera 1 and a center of a visual field (hereinafter referred to as the visual field center) in a state where the user faces the front do not normally match. For the user, it is desirable that the optical axis of the imaging lens 16 of the camera 1 is not used as a center of the clipped region, but the visual field center according to the posture or motion of the user is used as the center of the clipped region.

There are also individual differences in the visual field center and the movable range of the neck when the user turns the neck in each of directions other than a front direction, such as upward, downward, leftward, rightward, and oblique directions. A relationship between the face direction detected via the face direction detection window 13 and the visual field center also differs among individuals. In order to eliminate the individual differences, the user performs a calibration task that associates the face direction with the visual field center.

Figure 7:
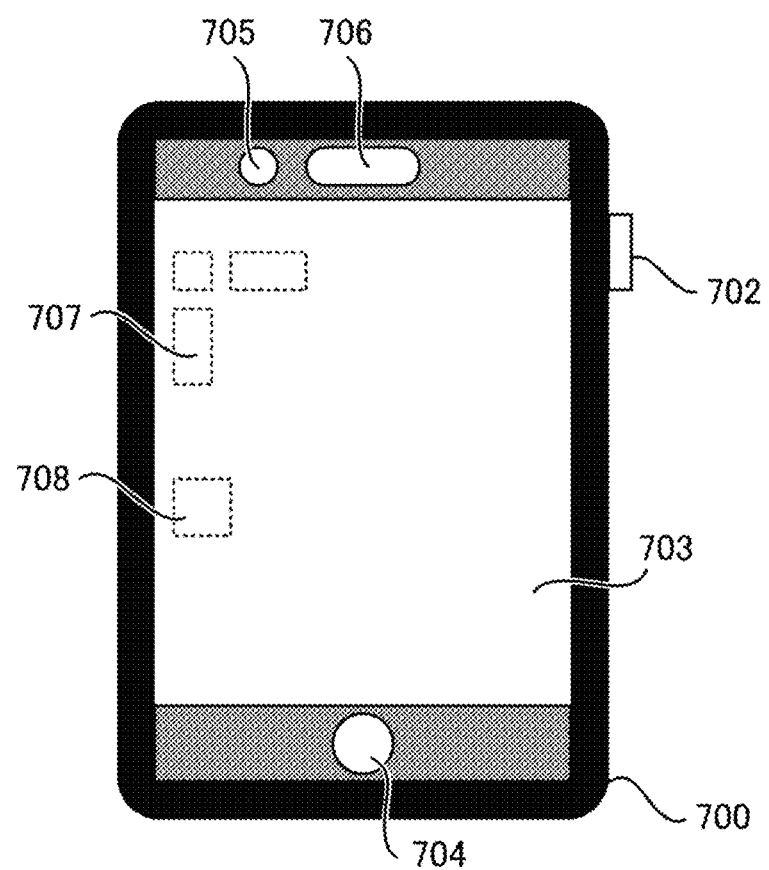
FIG. 7 is an appearance view of a display device for calibration processing.

FIG. 7 is an appearance view of a display device 700 for calibration processing. The calibration processing is processing of adjusting, according to the user wearing the camera 1, the region to be clipped (hereinafter referred to also as the recording region) specified in the image captured by the camera 1 on the basis of the face direction of the user. The calibration processing is preferably performed not only in the front direction, but also in each of directions such as upward, downward leftward, rightward, and oblique directions.

In FIG. 7, the display device 700 includes a power source button 702, a display portion 703, a button 704, a front camera 705, a face sensor 706, an angular speed sensor 707, and an acceleration sensor 708. Note that the display device 700 includes a communication interface that allows high-speed connection with the camera 1 via a wireless LAN or the like.

The power source button 702 receives an operation of turning ON/OFF a power source of the display device 700 with a long press. The power source button 702 also receives instructions for various processing with short presses. The display portion 703 can display the image captured by the camera 1 and also display a menu screen for calibration setting or the like. An upper surface of the display portion 703 is provided with a transparent touch sensor, and the touch sensor receives a touch operation with respect to the displayed screen (e.g., the menu screen). The button 704 is a button that receives, from the user, instructions for various functions such as the calibration processing.

The front camera 705 is a camera capable of imaging a person who is observing the display device 700. The face sensor 706 detects a face shape and a face direction of the person who is observing the display device 700. The face sensor 706 is among various sensors such as, e.g., an optical sensor, a ToF sensor, and a millimeter wave radar. The angular speed sensor 707 is within the display device 700, and is therefore denoted by a dotted line. The display device 700 has a function of a calibrator, and is equipped with a three-dimensional X-, Y-, and Z-direction gyro sensor (the angular speed sensor 707). The acceleration sensor 708 detects an attitude (inclination) of the display device 700.

The display device 700 includes the front camera 705 and the various sensors to implement the function of the calibrator. When the user turns his or her face in five directions which are, e.g., the front, upward, downward, leftward, and rightward directions, by performing the calibration processing in each of the directions, a clipping range is more appropriately decided. The calibration processing performed in the plurality of directions by using the front camera 705 and the various sensors is hereinafter referred to also as standard calibration processing.

It is assumed that the standard calibration processing is performed at initial activation of the camera 1 and, while the camera 1 is performing imaging, a position on the user at which the camera 1 is worn may shift. In the case of occurrence of the shift, it takes time and labor for the user to perform the calibration processing again in the plurality of directions, and accordingly the display device 700 has a function for simply performing the calibration processing. For example, the display device 700 has a function for performing the calibration processing by displaying a checking image representing an amount of deviation of a head region posture and allowing the user to adjust the position of the camera 1. This calibration processing is referred to also as simple calibration processing. The standard calibration processing and the simple calibration processing may be generally referred to also as the calibration processing.

Figure 8A:
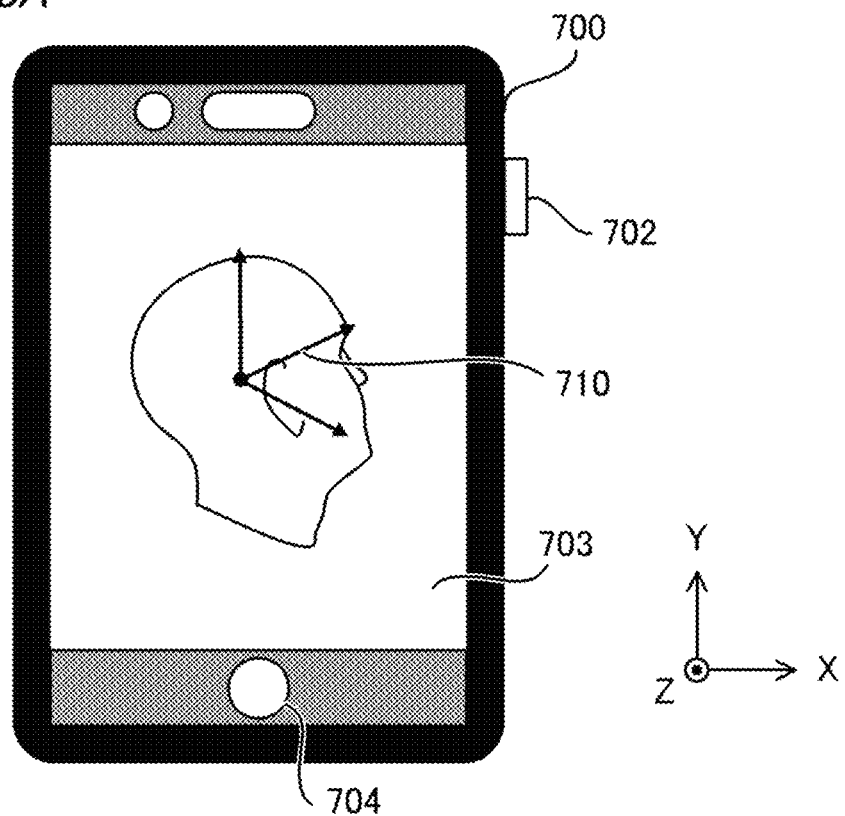
FIGS. 8A and 8B are diagrams illustrating simple calibration processing.
Figure 8B:
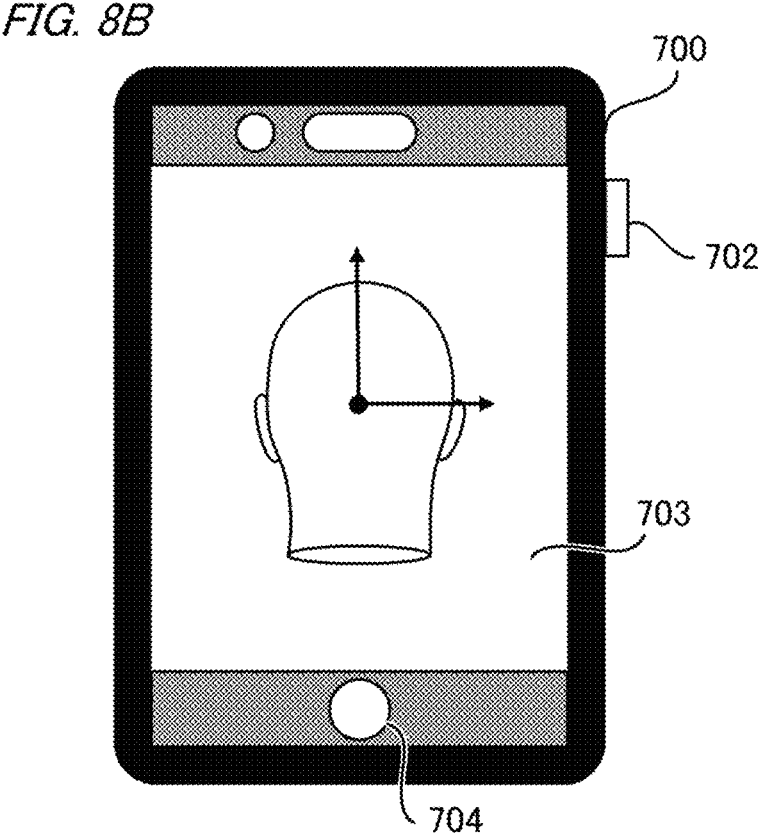

Referring to FIGS. 8A and 8B, a description will be given of the simple calibration processing in the display device 700. FIG. 8A illustrates an example in which the display device 700 displays calibration information (information related to a displacement of the recording region) received from the camera 1. The displacement of the recording region results from the deviation of the head region posture of the user with respect to the camera 1. Accordingly, information related to the displacement of the recording region is represented as, e.g., the deviation of the head region posture.

The display device 700 displays the checking image for adjusting the displacement of the recording region on the basis of an amount of deviation (amounts of deviation of angles in the X-, Y-, and Z-axis three directions) between the detected current head region posture and the head region posture when the calibration processing is performed. In the example in FIG. 8A, the checking image is an image obtained by superimposing arrows each representing the amount of deviation on an image of the head region. The checking image may also be a three-dimensional image.

The display device 700 may also change a color of an image of the head region depending on the amount of deviation. For example, the color of the image of the head region can be red when the amount of deviation is equal to or more than a predetermined value, yellow when the amount of deviation is less than the predetermined value, and green when there is substantially no amount of deviation. Alternatively, the display device 700 may also display the image of the head region in a state with no amount of deviation in a color different from that of the image of the head region representing a current state.

FIG. 8B illustrates a state where the camera 1 is disposed at an appropriate position by the simple calibration processing. The user adjusts the position and inclination of the camera 1 while viewing an image on the display portion 703 illustrated by way of example in FIG. 8B such that an arrow 710 representing the front direction of the face matches the optical axis direction (a Z-axis direction) of the camera 1. During the simple calibration processing, when the user changes the worn position of the camera 1 to change the inclination camera 1, the display device 700 receives information related to the displacement of the recording region acquired again by the camera 1. The display device 700 updates the checking image on the basis of the received information related to the displacement of the recording region.

When the arrow 710 representing the front direction of the face matches the optical axis direction of the camera 1, the user presses the button 704 to end the simple calibration processing. Note that the simple calibration processing is not limited to a method illustrated by way of example in FIGS. 8A and 8B. For example, the simple calibration processing may also be processing of performing the standard calibration processing in the front direction, and correcting respective amounts of deviation in the upward, downward, leftward, and rightward directions on the basis of an amount of deviation in the front direction. Alternatively, the display device 700 is not limited to the case where, as the checking image, the amount of deviation of the head region posture is displayed, and may also display an amount of shift of the camera 1. The user can adjust the position and inclination of the camera 1, while checking the amount of shift of the camera 1.

The display device 700 is, e.g., a mobile terminal such as a smartphone. The smartphone serving as the display device 700 can perform the calibration processing by associating firmware within the terminal with firmware within the camera 1. The display device 700 can also perform the calibration processing by associating the firmware within the camera 1 with an application or OS of the smartphone.

Note that the standard calibration processing and the simple calibration processing may also be implemented by different devices. The display device 700 for the simple calibration processing only needs to be able to display information on an amount of deviation in the calibration received from the camera 1 together with the image of the head region, and may also be a device of a simple configuration not including the front camera 705 and the various sensors.

Figure 9:
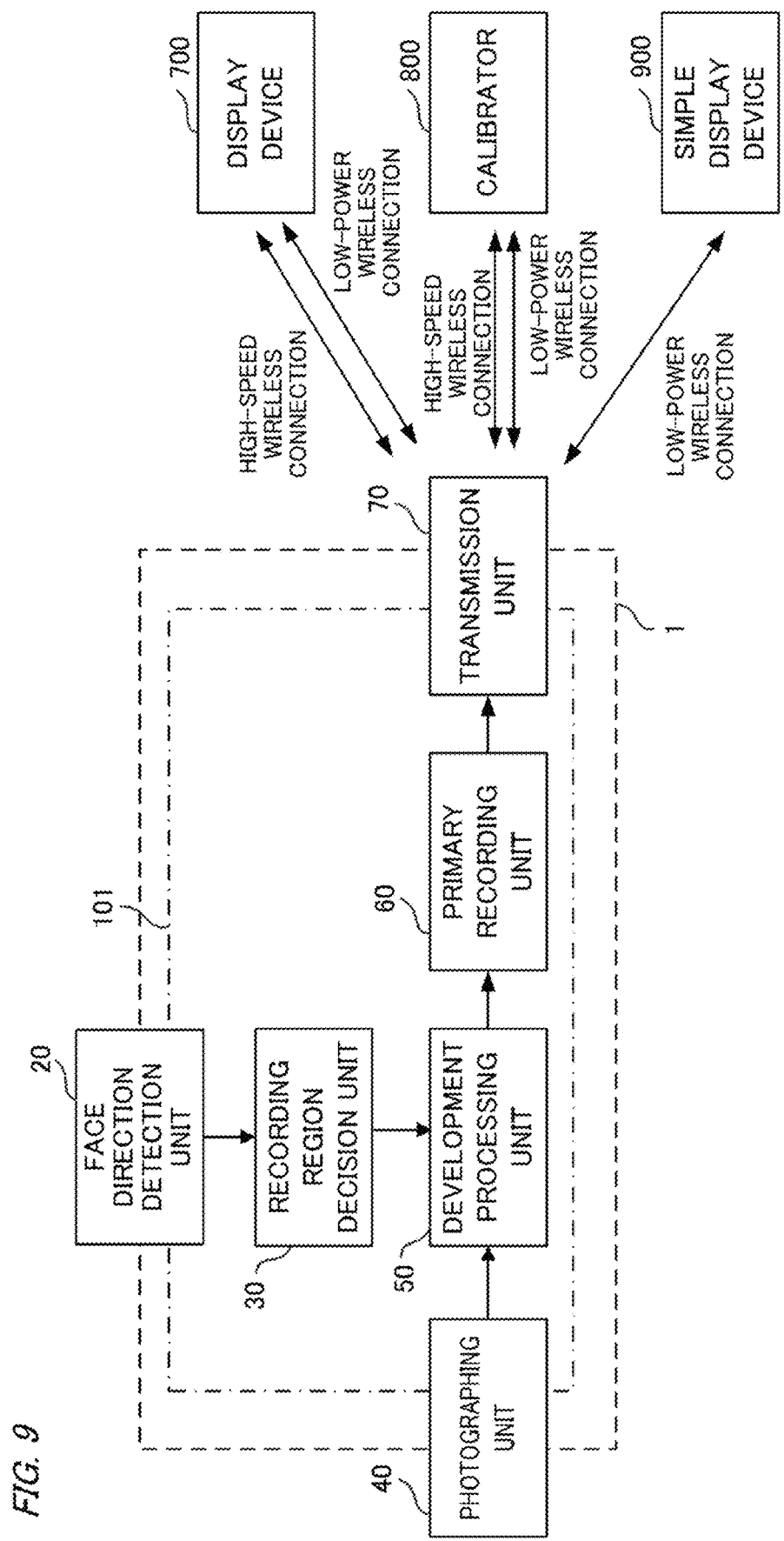
FIG. 9 is a functional block diagram of the camera.

FIG. 9 is a functional block diagram of the camera 1. The camera 1 includes the face direction detection unit 20, a recording region decision unit 30, the photographing unit 40, a development processing unit 50, a primary recording unit 60, and a transmission unit 70. Each of functional blocks will be described with reference to a hardware configuration illustrated in FIG. 10.

The face direction detection unit 20 detects the face direction by using an infrared LED 22, an infrared detection processing device 27, and the like each provided in the face direction detection window 13. The face direction to be detected is the head region posture of the user with respect to the camera 1. The head region posture can be acquired as directions (angles) of the head region in lateral and vertical directions of the camera 1 on the basis of, e.g., positional relationships between a jaw base, the chin, the nose, and the like of the user which are detected by the infrared detection processing device 27 or the like. The detected face direction (the head region posture of the user) is output to the recording region decision unit 30.

The recording region decision unit 30 uses the information on the face direction acquired by the face direction detection unit 20 to decide a position and a range of the recording region to be clipped from an image captured by the photographing unit 40. Note that the range (size) of the recording region may be a predetermined fixed size, or may also be variable depending on, e.g., a size of the subject. The information on the position and range of the recording region is, e.g., imaging direction and field angle information. The recording region decision unit 30 outputs information on the position and range of the decided recording region to the development processing unit 50.

The photographing unit 40 converts a light ray from the subject to an image, and outputs the image resulting from the conversion to the development processing unit 50. The development processing unit 50 uses the imaging direction and field angle information from the recording region decision unit 30 to clip the recording region from the image captured by the photographing unit 40 and develop the recording region. The development processing unit 50 clips the image (recording region) in a direction in which the user is looking, and stores the clipped image in the primary recording unit 60. The primary recording unit 60 is an embedded primary memory 103 (FIG. 10) or the like, and records image information. The image information recorded in the primary recording unit 60 can be transmitted by the transmission unit 70 to an external device.

The transmission unit 70 is a communication interface for communicating with a communication partner determined in advance. The transmission unit 70 is wirelessly connected to, e.g., the display device 700, a calibrator 800, and a simple display device 900 to transmit information on the image captured by the photographing unit 40 and the recording region or the like. The camera 1 is connected to at least any of the display device 700, the calibrator 800, and the simple display device 900 to be included in an imaging system.

The display device 700 is a display device capable of being connected to the transmission unit 70 of the camera 1 via a wireless LAN (hereinafter referred to as the "high-speed wireless network") capable of high-speed communication. The high-speed wireless communication is wireless communication compliant not only with, e.g., the IEEE 802.11ax (WiFi 6) standard, but also with a communication standard such as the WiFi 5 or the WiFi 4. The display device 700 may be a device developed exclusively for the camera 1, or may also be a general smartphone, tablet terminal, or the like.

The display device 700 may also be connected to the transmission unit 70 of the camera 1 via low-power wireless connection. The display device 700 and the transmission unit 70 may also be connected via both of or switchably between high-speed wireless connection and the low-power wireless connection. Data on a video image or the like may be transmitted via the high-speed wireless connection, while light-amount data smaller in data amount than that of the video image or data that may take a long time to transmit may be transmitted via the low-power wireless connection. Low-power wireless communication may be not only Bluetooth (registered trademark) communication, but also another near-field (short-distance) wireless communication such as an NFC (near Field Communication).

The calibrator 800 is a device for making initial setting and individual setting of the camera 1, which is a device capable of being connected to the transmission unit 70 of the camera 1 via the high-speed wireless connection or the low-power wireless connection, similarly to the display device 700. The display device 700 may also operate as the calibrator 800 by also performing the function of the calibrator 800.

The simple display device 900 is connected to the camera 1 via the low-power wireless connection. Due to time constraints, it is difficult for the simple display device 900 to transmit the video image, but the simple display device 900 can also be used to give an instruction for imaging start/stop timing or receive an image sufficient to check the composition. The simple display device 900 may be a device developed exclusively for the camera 1, or may also be a smartwatch or the like.

Figure 10:
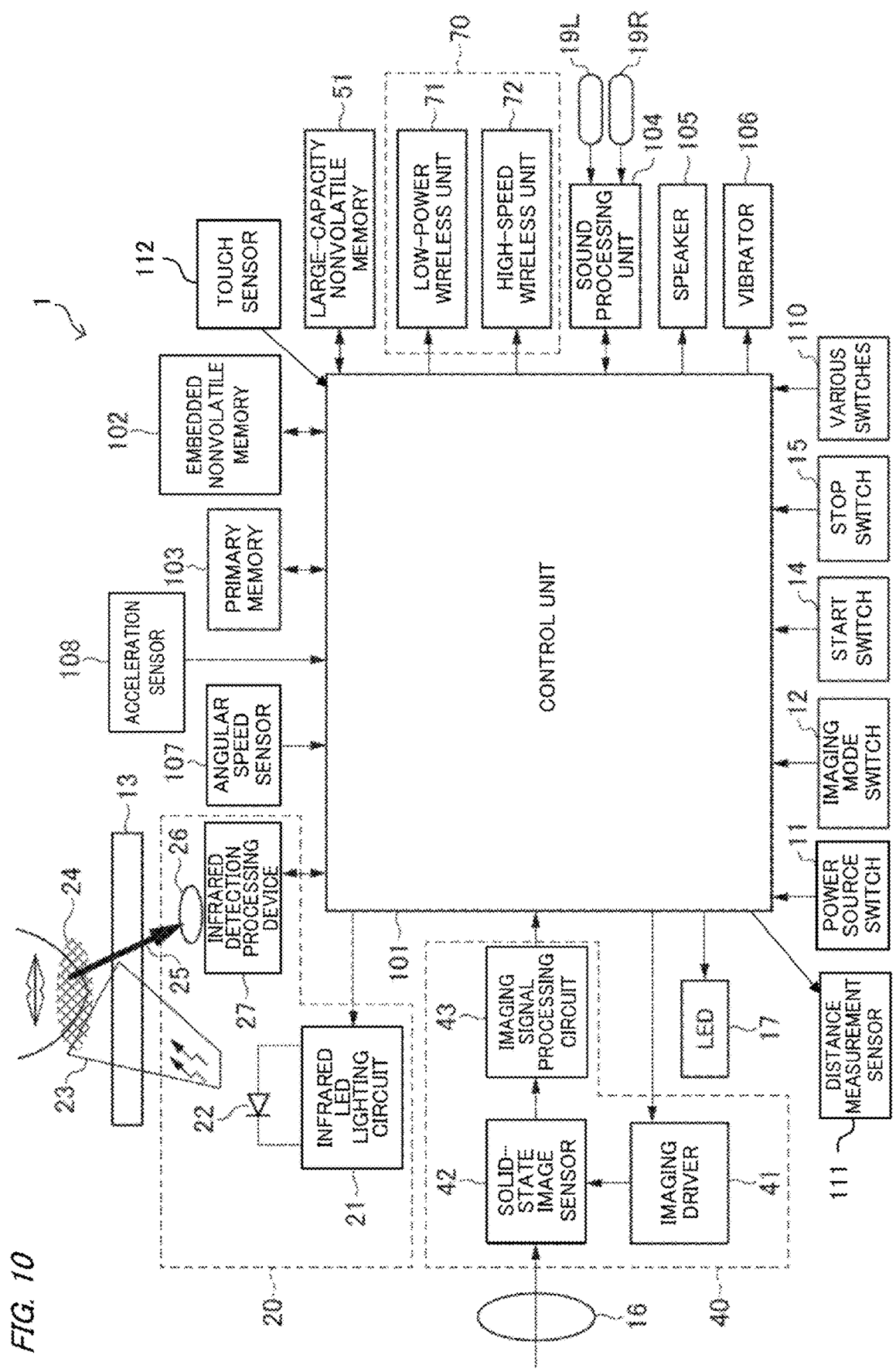
FIG. 10 is a diagram illustrating an example of a hardware configuration of the camera.

FIG. 10 is a diagram illustrating an example of the hardware configuration of the camera 1. In FIG. 10, the camera 1 includes a control unit 101, a power source switch 11, an imaging mode switch 12, the face direction detection window 13, the start switch 14, the stop switch 15, the imaging lens 16, and the LED 17.

The camera 1 includes the infrared LED lighting circuit 21, the infrared LED 22, the infrared ray condensing lens 26, and the infrared detection processing device 27 each included in the face direction detection unit 20 (FIG. 9). The camera 1 includes an imaging driver 41, the solid-state image sensor 42, and an imaging signal processing circuit 43 each included in the photographing unit 40 (FIG. 9). The camera 1 includes a low-power wireless unit 71 and a high-speed wireless unit 72 each included in the transmission unit 70 (FIG. 9).

In the example in FIG. 10, the camera 1 includes the one photographing unit 40, but may also include the two or more photographing units 40. By including the plurality of photographing units 40, the camera 1 can capture a 3D image (three-dimensional image), capture an image at an angle wider than the field angle that can be acquired by the one photographing unit 40, and perform the imaging in a plurality of directions.

The camera 1 includes various memories such as a large-capacity nonvolatile memory 51, an embedded nonvolatile memory 102, and the primary memory 103. The camera 1 includes a sound processing unit 104, a speaker 105, a vibrator 106, an angular speed sensor 107, an acceleration sensor 108, a distance measurement sensor 111, a touch sensor 112, and various switches 110.

The control unit 101 is, e.g., a CPU which is connected to the power source switch 11 or the like to control an operation of the camera 1 and implement various functions. The control unit 101 functions as each of the recording region decision unit 30 and the development processing unit 50 in FIG. 9. The control unit 101 also controls functions of determining whether or not the displacement of the recording region is to be adjusted and giving a notification that encourages the user or the display device 700 to adjust the displacement of the recording region.

The infrared LED lighting circuit 21 controls turning ON/OFF of the infrared LED 22, and controls projection of an infrared ray 23 directed from the infrared LED 22 toward the user. The face direction detection window 13 includes a visible light cut filter. The face direction detection window 13 does not substantially transmit a visible light beam, but sufficiently transmits the infrared ray 23 and a reflected light ray 25 of the infrared ray 23 each corresponding to light in an infrared region.

The infrared ray condensing lens 26 is a lens that condenses the reflected light ray 25. The infrared detection processing device 27 has a sensor that detects the reflected light ray 25 condensed by the infrared ray condensing lens 26. The sensor of the infrared detection processing device 27 focuses the condensed reflected light ray 25 into an image, converts the image to sensor data, and outputs the sensor data to the control unit 101.

As illustrated in FIG. 2, when the camera 1 is worn around the neck of the user, the face direction detection window 13 is located under the jaw of the user. The infrared ray 23 projected from the infrared LED lighting circuit 21 is transmitted by the face direction detection window 13 to irradiate an infrared ray irradiation surface 24 in the vicinity of the jaw of the user, as illustrated in FIG. 10. The infrared ray 23 reflected by the infrared ray irradiation surface 24 is transmitted as the reflected light ray 25 by the face direction detection window 13 to be condensed by the infrared ray condensing lens 26 onto the sensor of the infrared detection processing device 27.

The various switches 110 are switches for performing functions other than the functions performed by the power source switch 11, the imaging mode switch 12, the face direction detection window 13, the start switch 14, and the stop switch 15.

The imaging driver 41 includes a timing generator and the like, and generates various timing signals related to imaging. The imaging driver 41 outputs the generated timing signals to the individual units related to the imaging to drive imaging processing.

The solid-state image sensor 42 outputs a signal obtained by photoelectrically converting a subject image projected from the imaging lens 16 to the imaging signal processing circuit 43. The imaging signal processing circuit 43 outputs, in response to the signal from the solid-state image sensor 42, imaging data generated by processing such as clamping or A/D conversion to the control unit 101.

The embedded nonvolatile memory 102 is, e.g., a flash memory, and stores set values for an activation program for the control unit 101 and various program modes. The embedded nonvolatile memory 102 also stores set values for an observation visual field (field angle) change, an effect level of vibration control, and the like.

The primary memory 103 is, e.g., a RAM (Random Access Memory), and temporarily stores image data being processed, an arithmetic result from the control unit 101, calibration information, and the like.

The large-capacity nonvolatile memory 51 records data on a captured image and the like. The large-capacity nonvolatile memory 51 may also be a semiconductor memory without a removable mechanism, or may also be a removable recording medium such as an SD card. Alternatively, the large-capacity nonvolatile memory 51 may also be configured as a memory integrated with the embedded nonvolatile memory 102.

The low-power wireless unit 71 transmits/receives data to/from the display device 700, the calibrator 800, and the simple display device 900 via the low-power wireless connection. The high-speed wireless unit 72 transmits/receives data to/from the display device 700 and the calibrator 800 via the high-speed wireless connection.

The sound processing unit 104 includes the right microphone 19R and the left microphone 19L that pick up external sounds (analog signals), and processes the picked-up analog signals to generate sound signals. Each of the LED 17, the speaker 105, and the vibrator 106 emits light, emits a sound, or vibrates to notify the user of a state of the camera 1 or warns the user.

The angular speed sensor 107 is a gyro sensor, and detects movement of the camera 1. The acceleration sensor 108 detects a posture (inclination) of the photographing/detection unit 10. The angular speed sensor 107 and the acceleration sensor 108 are embedded in the photographing/detection unit 10. The distance measurement sensor 111 is, e.g., a ToF sensor, and measures a distance to the subject. The touch sensor 112 is embedded in, e.g., the chest region connection pad 18 to sense contact with the user.

Figure 11:
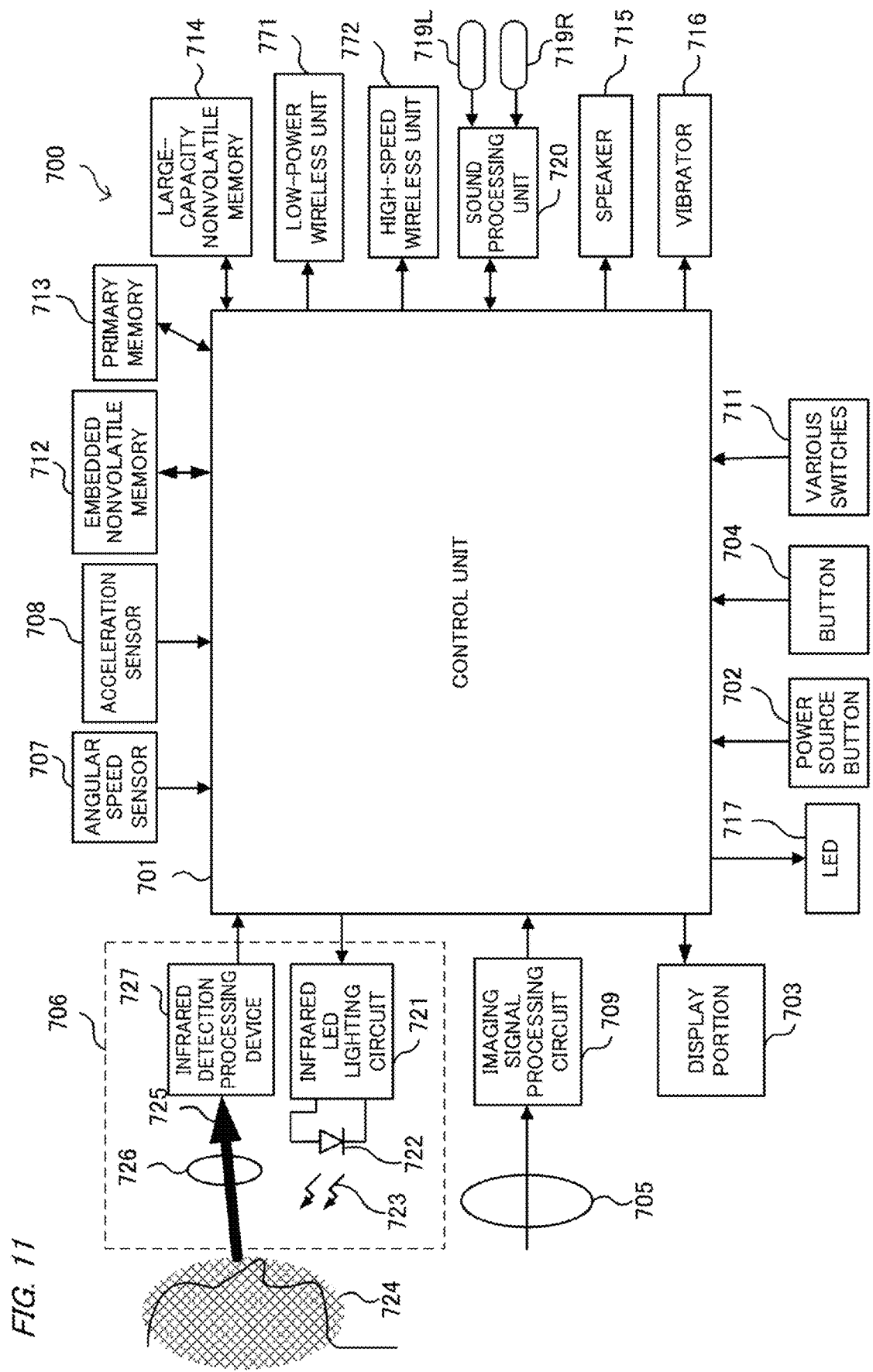
FIG. 11 is a diagram illustrating an example of a hardware configuration of the display device.

FIG. 11 is a diagram illustrating an example of a hardware configuration of the display device 700. In FIG. 11, the display device 700 includes a control unit 701, a power source button 702, the display portion 703, the button 704, the front camera 705, the face sensor 706, the angular speed sensor 707, the acceleration sensor 708, an imaging signal processing circuit 709, and various switches 711.

The display device 700 also includes an embedded nonvolatile memory 712, a primary memory 713, a large-capacity nonvolatile memory 714, a speaker 715, a vibrator 716, an LED 717, a sound processing unit 720, a low-power wireless unit 771, and a high-speed wireless unit 772.

The control unit 701 is, e.g., a CPU, and is connected to the power source button 702, the face sensor 706, and the like to control an operation of the display device 700.

The imaging signal processing circuit 709 implements functions equivalent to those of the imaging driver 41, the solid-state image sensor 42, and the imaging signal processing circuit 43 of the camera 1. Imaging data generated by the imaging signal processing circuit 709 is output to the control unit 701.

The various switches 711 are switches for performing functions other than the functions performed by the power source button 702 and the button 704.

The angular speed sensor 707 is a gyro sensor, and detects movement of the display device 700. The acceleration sensor 708 detects the attitude of the display device 700. The angular speed sensor 707 and the acceleration sensor 708 are embedded in the display device 700.

The embedded nonvolatile memory 712 is, e.g., a flash memory, and stores set values for the activation program for the control unit 701 and the various program modes. The primary memory 713 is, e.g., a RAM, and temporarily stores image data being processed and arithmetic results from the imaging signal processing circuit 709 and the control unit 701.

The large-capacity nonvolatile memory 714 records image data resulting from the imaging or image data received from the external device. The large-capacity nonvolatile memory 714 may be a removable recording medium such as an SD card, or may also be a semiconductor memory having no removable mechanism.

Each of the speaker 715, the vibrator 716, and the LED 717 emits a sound, vibrates, or emits light to notify the user of a state of the display device 700 or warn the user. The sound processing unit 720 includes a left microphone 719L and a right microphone 719R that pick up external sounds (analog signals), and processes the picked-up analog signals to generate sound signals.

The low-power wireless unit 771 transmits/receives data to/from the camera 1 via the low-power wireless connection. The high-speed wireless unit 772 transmits/receives data to/from the camera 1 via the high-speed wireless connection.

The face sensor 706 includes an infrared LED lighting circuit 721, an infrared LED 722, an infrared ray condensing lens 726, and an infrared detection processing device 727. The infrared LED lighting circuit 721 is a circuit having the same function as that of the infrared LED lighting circuit 21 in FIG. 10. The infrared LED lighting circuit 721 controls turning ON/OFF of the infrared LED 722, and controls projection of an infrared ray 723 directed from the infrared LED 722 toward the user.

The infrared ray condensing lens 726 is a lens that condenses a reflected light ray 725 of the infrared ray 723. The infrared detection processing device 727 has a sensor that detects the reflected light ray condensed by the infrared ray condensing lens 726. The sensor of the infrared detection processing device 727 focuses the condensed reflected light ray 725 into an image, converts the image to sensor data, and outputs the sensor data to the control unit 701.

When the face sensor 706 illustrated in FIG. 7 is pointed at the user, as illustrated in FIG. 11, the infrared ray 723 projected from the infrared LED lighting circuit 721 irradiates an infrared ray irradiation surface 724 corresponding to the entire face of the user. The infrared ray 723 reflected by the infrared ray irradiation surface 724 becomes the reflected light ray 725, which is condensed by the infrared ray condensing lens 726 onto the sensor of the infrared detection processing device 727.

Figure 12:
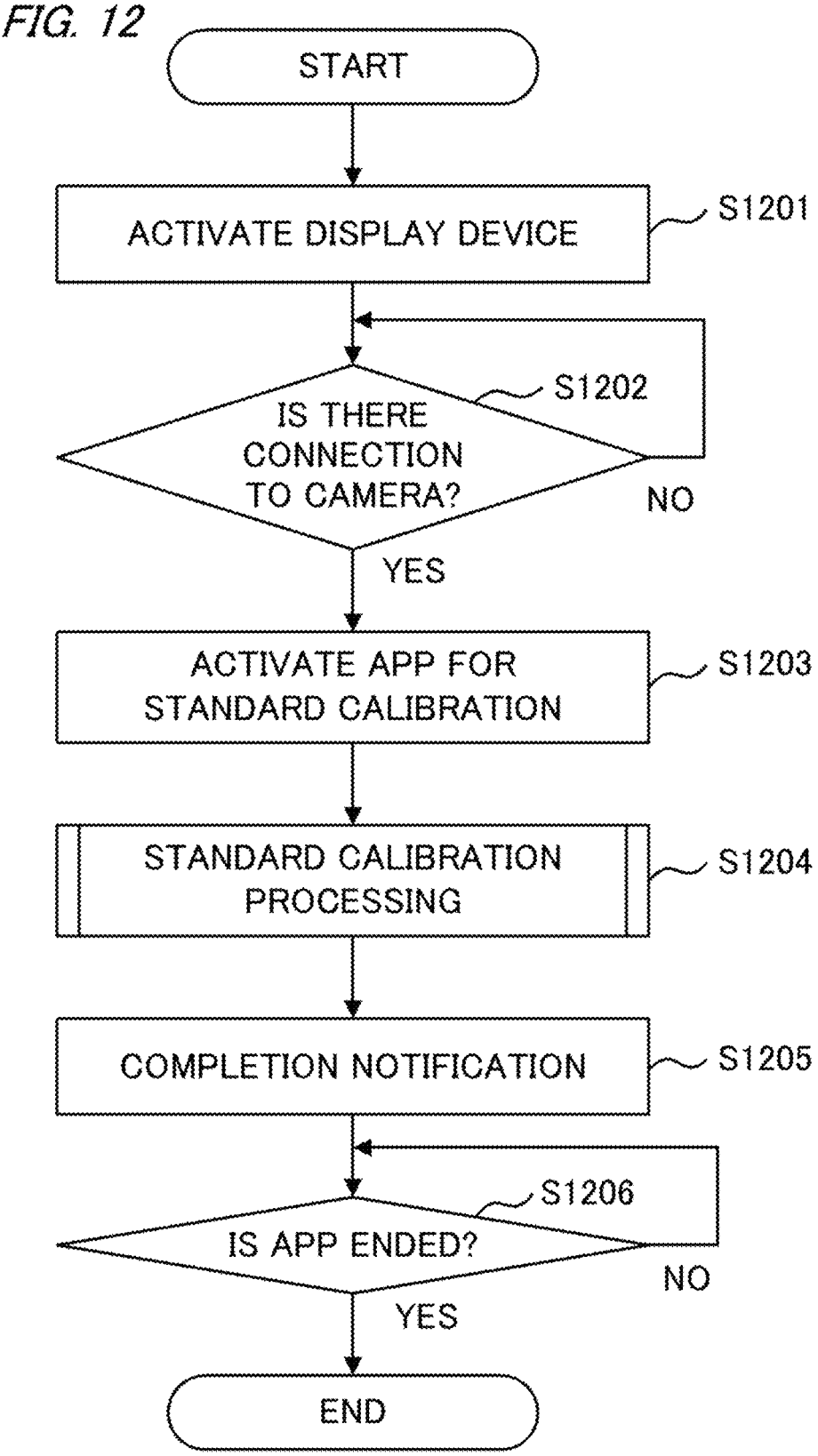
FIG. 12 is a flow chart illustrating an example of standard calibration processing.

Referring to FIG. 12, a flow of the standard calibration processing will be described. It is assumed herein that the display device 700 operates as the calibrator 800. The standard calibration processing is performed in a state where the user with the camera 1 worn around the neck is viewing a positioning index displayed on the display device 700. For example, in the standard calibration processing performed in the front direction, in a state where the user is viewing the positioning index on the display device 700 held in front of him or her, the camera 1 photographs the positioning index displayed on the display device 700. The camera 1 stores, as calibration information, information representing a relationship between coordinates of the positioning index and the face direction (the head region posture) when the positioning index is photographed in the primary memory 103 or the like.

In S1201, the control unit 701 responds to, e.g., an operation from the user to activate the display device 700. Note that the display device 700 may also be activated by an instruction from the camera 1 when the user performs an operation for performing the standard calibration processing with respect to the camera 1.

In S1202, the control unit 701 is connected to the camera 1 to exchange information to be used for the standard calibration processing. The control unit 701 determines whether or not the control unit 701 is connected to the camera 1 and communication is started. The control unit 701 stands by until the communication is started, and advances to S1203 when the communication is started.

In S1203, the control unit 701 activates an application (hereinafter referred to also as the app) for the standard calibration processing. The app for the standard calibration processing may also be activated by an operation by the user, or may also be automatically activated by an instruction (notification) from the camera 1.

In S1204, the control unit 701 performs the standard calibration processing. The standard calibration processing is performed in a plurality of directions. For example, the standard calibration processing is performed in five directions on a front (center portion) side of an imaging range, on a front upper side thereof, on a front lower side thereof, on a front right side thereof, and on a front left side thereof.

Figure 13:
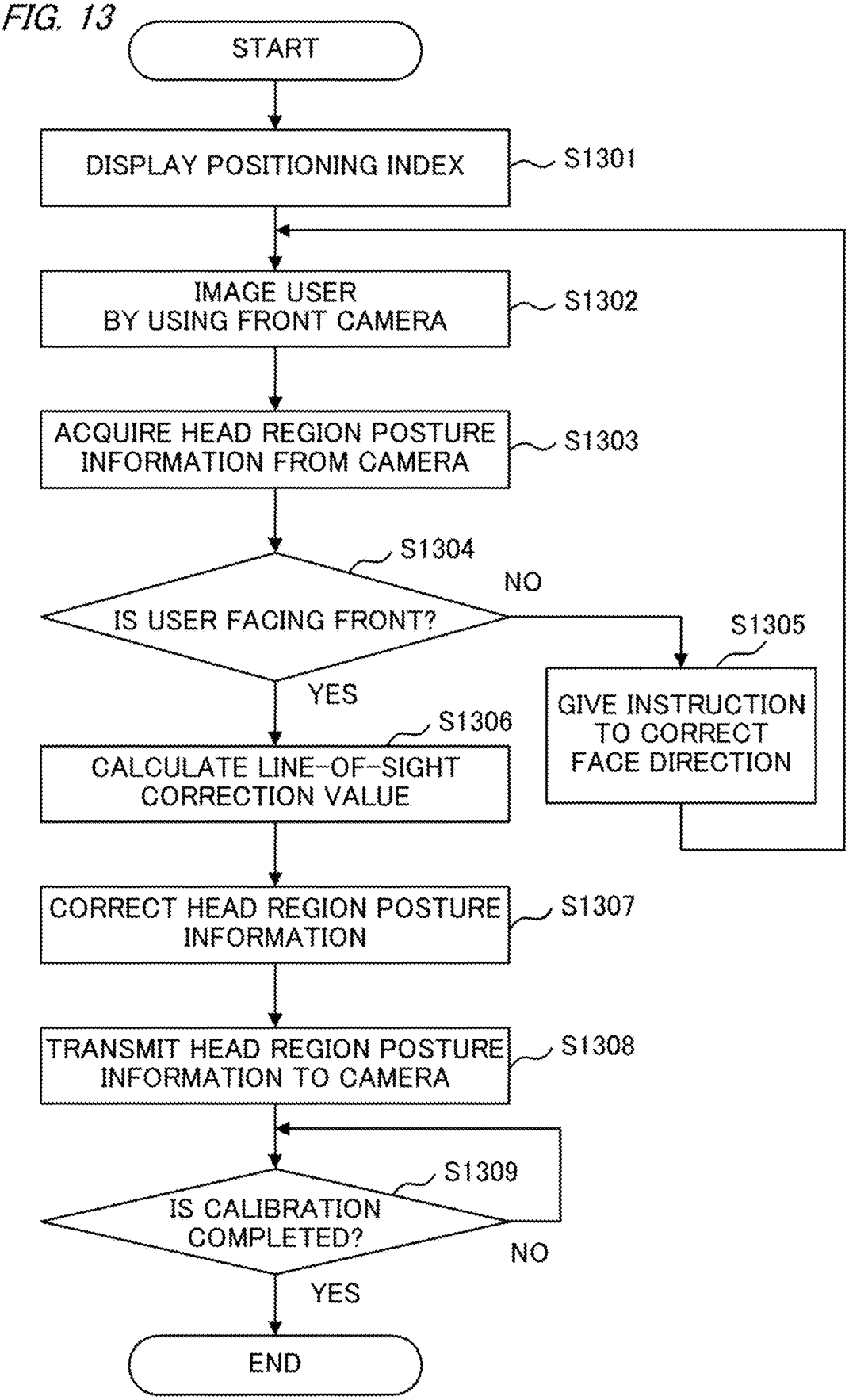
FIG. 13 is a flow chart illustrating an example of details of the standard calibration processing.

Referring to FIG. 13, a description will be given of details of the standard calibration processing in S1204. FIG. 13 is a flow chart illustrating an example of the details of the standard calibration processing. FIG. 13 illustrates the standard calibration processing performed on the front side of the imaging range.

In S1301, the display portion 703 displays the positioning index to display guidance that specifies a direction in which the standard calibration processing is to be performed. In the standard calibration processing performed in the front direction illustrated by way of example in FIG. 13, the display portion 703 displays the guidance for the user to hold the display device 700 such that the positioning index is located in front and turn the face toward the positioning index.

Figure 14:
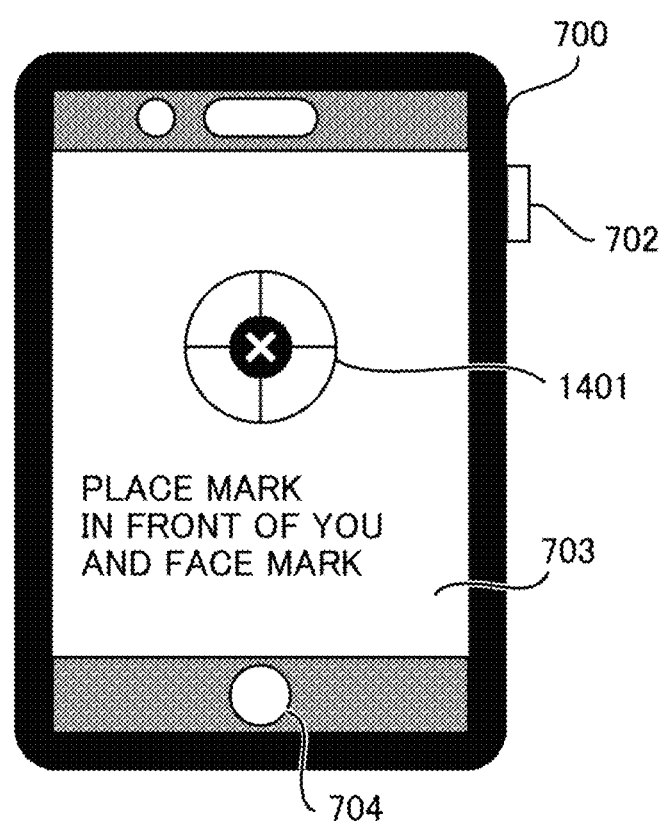
FIG. 14 is a diagram illustrating an example of a positioning index.

FIG. 14 is a diagram illustrating an example of a positioning index 1401. The user follows the guidance to locate the positioning index 1401 (mark) in front, turn his or her face toward the positioning index 1401, and press the button 704. When the button 704 is pressed, the camera 1 starts the standard calibration processing in the front direction.

In S1302, the control unit 701 uses the front camera 705 to image the user. The image captured by the front camera 705 is used to check whether or not the user is facing the front or acquire a line-of-sight position of the user.

In S1303, the control unit 701 acquires head region posture information. The head region posture information mentioned herein is information on the head region posture with respect to a horizontal surface, and is acquired from the face direction (the head region posture with respect to the camera 1) detected by the face direction detection unit 20 and from the inclination of the photographing/detection unit 10 detected by the acceleration sensor 108.

In S1304, the control unit 701 determines whether or not the user is facing the front on the basis of the position of the head region of the user imaged by the front camera 705, the inclination of the display device 700 detected by the acceleration sensor 708, the information acquired from the camera 1 in S1303, and the like. When the user is not facing the front, the processing advances to S1305 while, when the user is facing the front, the processing advances to S1306.

In S1305, the control unit 701 displays, on the display portion 703, guidance to notify the user to correct the face direction. The user changes the face direction or adjusts the position at which the display device 700 is held to correct the face direction. When the user has corrected the face direction, the control unit 701 returns to S1302 to continue the standard calibration in the front direction.

In S1306, the control unit 701 acquires line-of-sight position information from the image of the user captured by the front camera 705, and calculates a line-of-sight correction value on the basis of the line-of-sight position information and the head region posture information acquired from the camera 1 in S1303.

In S1307, the control unit 701 corrects the head region posture information of the user in consideration of the line-of-sight correction value calculated in S1306. In S1308, the control unit 701 transmits frontal head region posture information corrected by the display device 700 to the camera 1, and the camera 1 performs the standard calibration processing on the basis of the received head region posture information.

In S1309, the control unit 701 determines whether or not the standard calibration processing in the front direction has been completed in the camera 1. The control unit 701 receives, from the camera 1, a notification of the completion of the standard calibration processing in the front direction and thereby ends the processing illustrated in FIG. 13.

When the standard calibration processing in the front direction is ended, the control unit 701 performs the standard calibration processing in each of the directions on the front upper side, the front lower side, the front right side, and the front left side in the same manner as in the front direction. Note that the directions and order of the standard calibration processing are optional, and the number of the directions is not limited to five, and may also be smaller or larger than five. The directions in which the standard calibration is to be performed is not limited to the upward, downward, leftward, and rightward directions, and may also be directions such as an obliquely upward direction and an obliquely downward direction. In other words, in the processing in S1204 in FIG. 12, the control unit 701 performs the processing illustrated in FIG. 13 in each of the directions in which the standard calibration processing is to be performed.

In S1205 in FIG. 12, when the standard calibration processing in each of the directions is completed, the control unit 701 notifies the user of the end. In S1206, the control unit 701 determines whether or not the app for the standard calibration is ended. The app for the standard calibration may be ended by, e.g., an operation by the user or may also be automatically ended when the standard calibration processing in each of the directions is completed. When the app for the standard calibration is ended, the standard calibration processing is ended.

Figure 15:
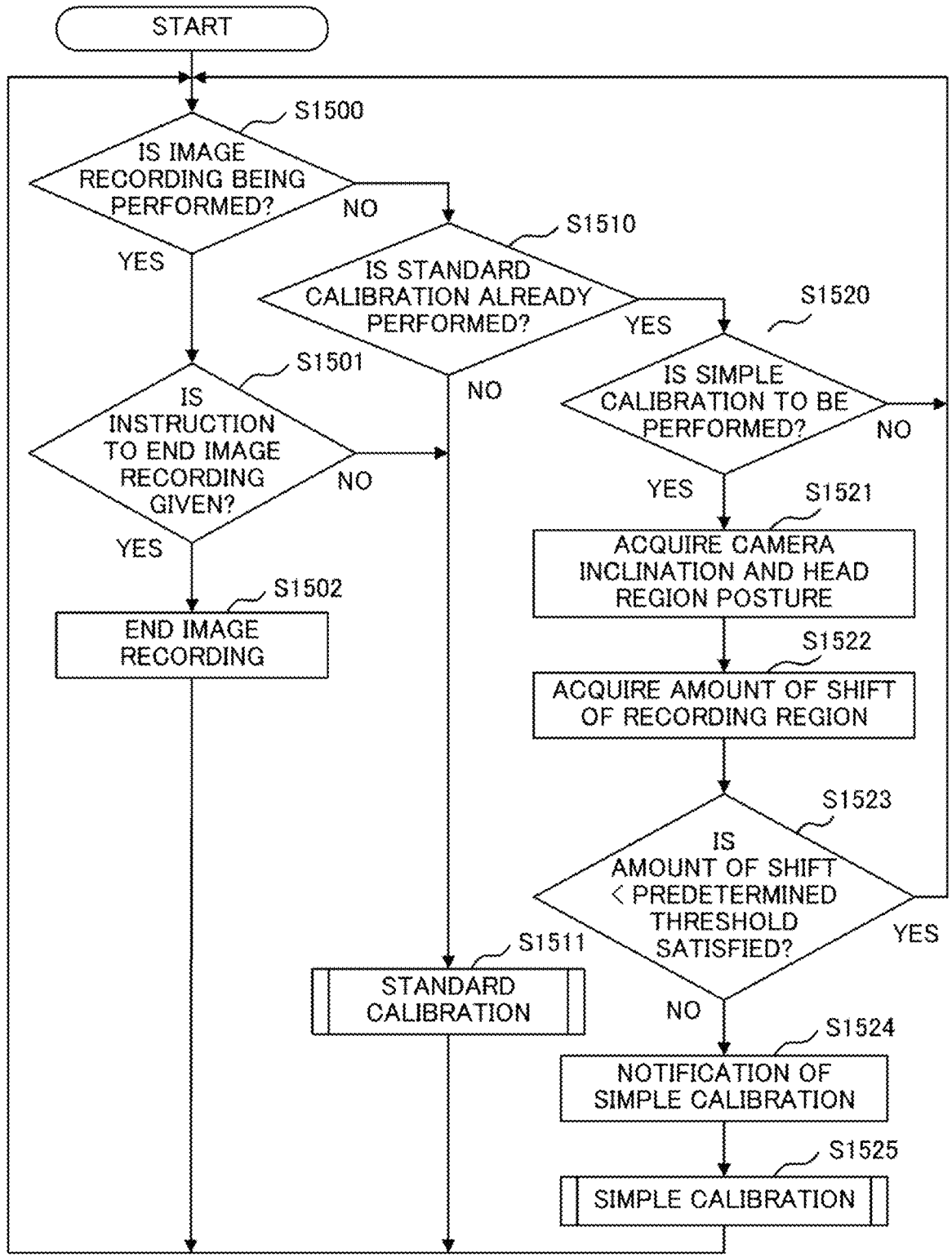
FIG. 15 is a flow chart illustrating an example of calibration checking processing.
Figure 16A:
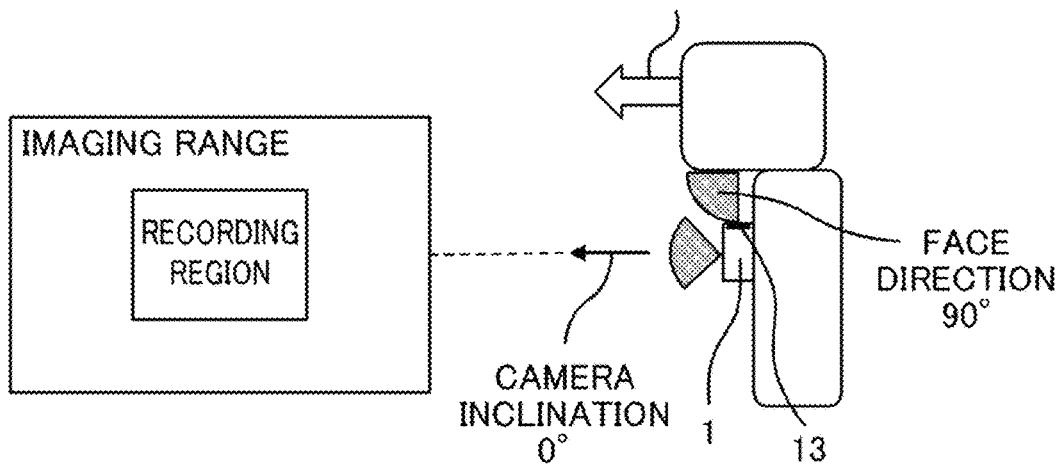
FIGS. 16A to 16C are diagrams illustrating a displacement of a recording region.
Figure 16B:
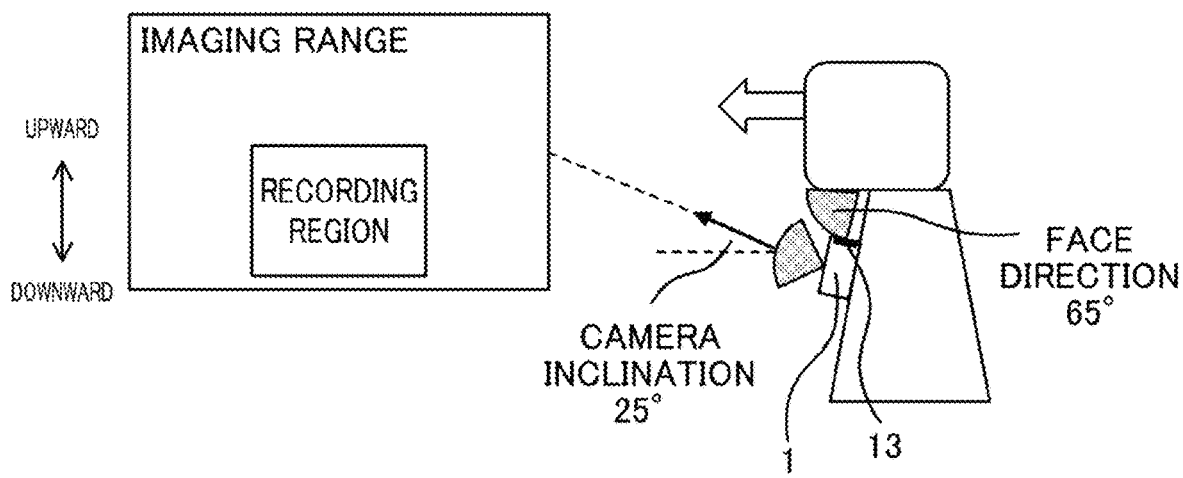
Figure 16C:
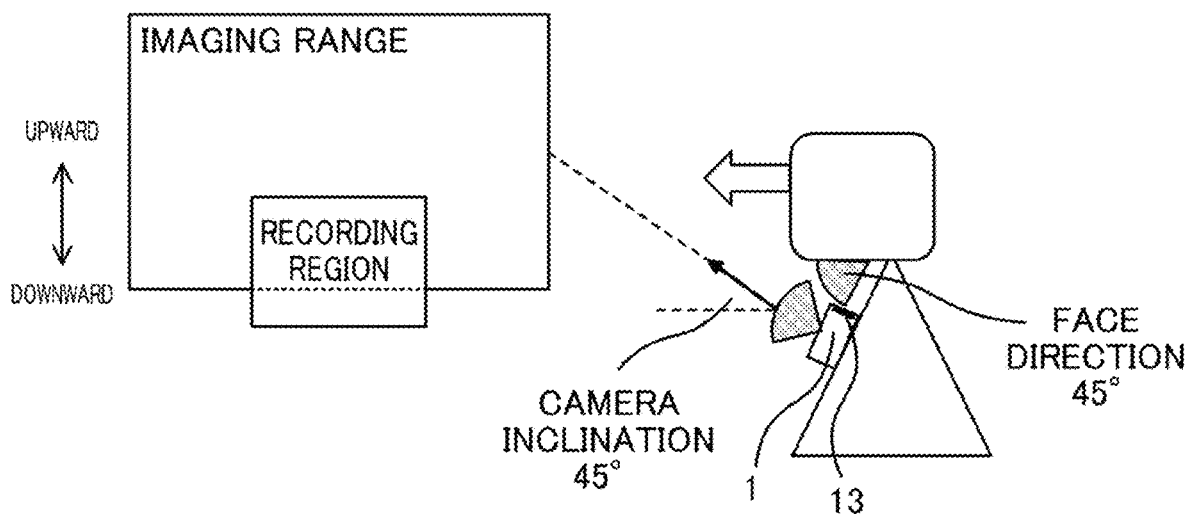
Figure 17:
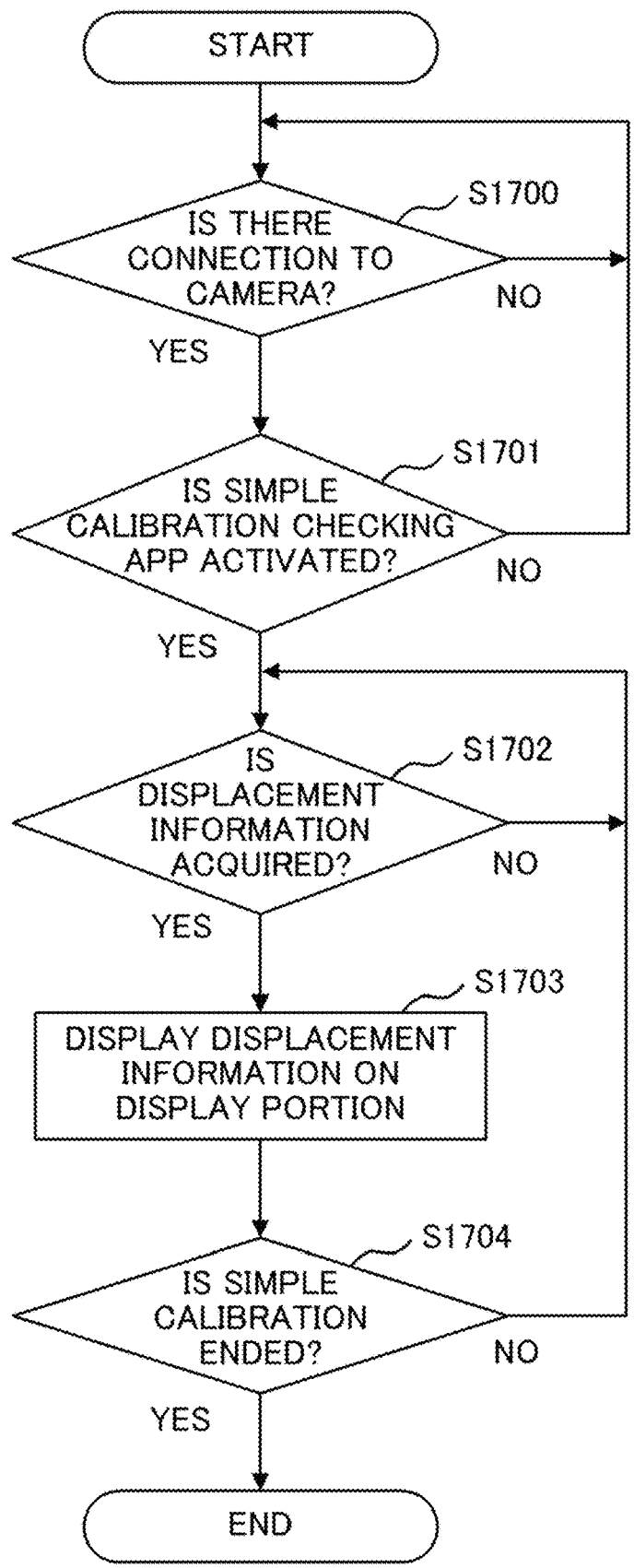
FIG. 17 is a flow chart illustrating the simple calibration processing in the display device.

Referring to FIGS. 15 to 17, a description will be given of calibration checking processing. The calibration checking processing is processing of checking and controlling timing with which each of the standard calibration processing and the simple calibration processing is to be performed.

Of the calibration processing, the standard calibration processing illustrated in FIGS. 12 to 14 is performed before the camera 1 is used first or before photographing is started. The simple calibration processing is processing of simply adjusting calibration in such as a case as where the worn position of the camera 1 has shifted during imaging. The simple calibration processing can be performed by an operation simpler than that for the standard calibration processing.

The simple calibration processing can be performed using the same display device 700 or the same calibrator 800 as that used for the standard calibration processing. The simple calibration processing may also be performed using the simple display device 900 having functions more limited than those of the display device 700. The following description will be given on the assumption that the simple calibration processing is performed by the display device 700.

When the worn position of the camera 1 shifts during the imaging, the recording region clipped from the imaging range of the camera 1 is displaced. When the user does not notice the shift of the worn position of the camera 1 during the imaging, the recording region intended by the user is no longer clipped. In the present embodiment, when it is assumed that the recording region is displaced, the camera 1 notifies the user to perform the simple calibration processing.

FIG. 15 is a flow chart illustrating an example of the calibration checking processing. The calibration checking processing is started by, e.g., the turning ON of the power source of the camera 1. In S1500, the control unit 101 of the camera 1 determines whether or not image recording is being performed by the photographing unit 40. When the image recording is being performed, the processing advances to S1501. When the image recording is not being performed, the processing advances to S1510.

In S1501, the control unit 101 determines whether or not an instruction to end the image recording is given from the user. During a period until the instruction to end the image recording is given, the image recording is continued. When the instruction to end the image recording is given, the processing advances to S1502. In S1502, the control unit 101 ends the image recording, and the processing returns to S1500. The camera 1 enters a photographing instruction standby state.

In S1510 during standby of a photographing instruction, the control unit 101 determines whether or not the standard calibration processing is already performed. When the standard calibration processing is not performed yet, the processing advances to S1511. When the standard calibration processing is already performed, the processing advances to S1520.

In S1511, the control unit 101 performs the standard calibration processing illustrated in FIGS. 12 and 13. When the standard calibration processing is completed, the processing returns to S1500, and the camera 1 enters the photographing instruction standby state.

In S1520, the control unit 101 determines whether or not the simple calibration processing is to be performed. In other words, the control unit 101 determines whether or not to adjust the displacement of the recording region. When the simple calibration processing is to be performed, the processing advances to S1521. When the simple calibration processing is not to be performed, the processing returns to S1500, and the camera 1 enters the photographing instruction standby state.

A specific description will be given of a method of determining whether or not the simple calibration processing is to be performed in S1520, i.e., whether or not the displacement of the recording region is to be adjusted. A description will be given below of six specific examples, but the method of determining whether or not the simple calibration processing is to be performed only needs to be able to determine whether or not the recording region may be displaced, and is not limited to the following methods.

The first determination method is a method of making the determination on the basis of an amount of deviation between the position of the recording region in the imaging range when the standard calibration processing (or the simple calibration processing performed immediately before) is performed and the current position of the recording region.

FIGS. 16A to 16C are diagrams illustrating the displacement of the recording region. In FIG. 16A, the camera 1 faces the front direction, and an angle of the optical axis of the camera 1 (the imaging lens 16) is 0° with respect to a horizontal direction. The face direction of the user with respect to the camera 1 is 90°. It is assumed that the face direction is a direction of a line of sight with respect to a vertical direction of the face direction detection window 13. In this case, the recording region is located substantially at a center of the imaging range.

In FIG. 16B, the camera 1 is inclined upward with respect to the front direction, and the angle of the optical axis of the camera 1 is 25° with respect to the horizontal direction. Since the user remains facing the front, the face direction of the user with respect to the camera 1 is 65°. In this case, the recording region shifts downward in a direction in which the user is actually looking.

In FIG. 16C, the camera 1 is further inclined upward with respect to the front direction, and the angle of the optical axis of the camera 1 is 45° with respect to the horizontal direction. Since the user remains facing the front, the face direction of the user with respect to the camera 1 is 45°. In this case, the recording region shifts downward in the direction in which the user is actually looking to spread out of the imaging range.

In the first determination method, to prevent the recording region from spreading out of the imaging range, the control unit 101 notifies the user to perform the simple calibration processing when the amount of the displacement of the recording region becomes equal to or more than a predetermined threshold. For example, assuming that, e.g., the position of the recording region is center coordinates of the recording region, the control unit 101 can calculate a center coordinate distance between the recording region during the calibration and the current recording region as the amount of deviation. The predetermined threshold only needs to be decided according to, e.g., sizes of the imaging range and the recording region such that the recording region does not fall outside the imaging range.

When the amount of the displacement of the recording region becomes equal to or more than the predetermined threshold, the camera 1 encourages the user to perform the simple calibration processing and can thereby prevent the recording region from falling outside the imaging range.

The second determination method is a method of making the determination on the basis of an amount of deviation between an inclination of the camera 1 when the standard calibration processing (or the simple calibration processing performed immediately before) is performed and a current inclination of the camera 1.

In the second determination method, when the current amount of deviation of the inclination of the camera 1 becomes equal to or more than the predetermined threshold, the control unit 101 notifies the user to perform the simple calibration processing. The inclination of the camera 1 can be represented by, e.g., the angle of the optical axis of the camera 1 with respect to the horizontal direction, as illustrated in FIGS. 16A to 16C.

For example, it is assumed that the inclination of the camera 1 when the calibration processing is performed is 0° as illustrated in FIG. 16A, and the predetermined threshold is 25°. As illustrated in FIG. 16B, when the inclination of the camera 1 becomes 25°, the control unit 101 encourages the user to perform the simple calibration processing.

Note that, in the example in FIGS. 16A to 16C, the description has been given on the assumption that the inclination of the camera 1 is the inclination in the vertical direction, but the inclination of the camera 1 may also be represented by an inclination (angles) in three axis directions. When information on the inclination of the camera 1 is represented by the inclination in the three axis directions, the amount of deviation may also be a total of amounts of deviation in the individual directions. Whether or not the amount of deviation has become equal to or more than the predetermined threshold may also be determined on the basis of whether or not the amount of deviation in each of the directions is equal to or more than a predetermined threshold corresponding thereto.

When the amount of deviation of the inclination of the camera 1 becomes equal to or more than the predetermined threshold, the camera 1 encourages the user to perform the simple calibration processing and can thereby inhibit the recording region intended by the user from falling outside the imaging range due to the displacement of the camera 1.

The third determination method is a method of making the determination on the basis of an amount of deviation between the head region posture of the user when the standard calibration processing (or the simple calibration processing performed immediately before) is performed and the current head region posture of the user. Note that the head region posture is the head region posture with respect to the camera 1.

In the third determination method, when the amount of deviation of the current head region posture of the user becomes equal to or more than the predetermined threshold, the control unit 101 notifies the user to perform the simple calibration processing. The head region posture of the user can be the line-of-sight direction with respect to the vertical direction of the face direction detection window 13 similarly to the face direction illustrated in, e.g., FIGS. 16A to 16C.

For example, it is assumed that the head region posture of the user when the calibration processing is performed is 90° as in FIG. 16A, and the predetermined threshold is 25°. As illustrated in FIG. 16B, when the head region posture of the user becomes 65° and the amount of deviation becomes 25°, the control unit 101 encourages the user to perform the simple calibration processing.

Note that, in the example in FIGS. 16A to 16C, information of the head region posture of the user has been described as the inclination in the vertical direction, but may also be represented by the inclination (angles) in the three axis directions. When the head region posture information is represented by the inclinations in the three axis directions, the amount of deviation may also be a total of amounts of deviation in the individual directions. Whether or not the amount of deviation has become equal to or more than the predetermined threshold may also be determined on the basis of whether or not the amount of deviation in each of the directions is equal to or more than a predetermined threshold corresponding thereto.

When the amount of deviation of the head region posture of the user becomes equal to or more than the predetermined threshold, the camera 1 encourages the user to perform the simple calibration processing, and can thereby inhibit the recording region intended by the user from falling outside the imaging range due to a change in a positional relationship between the camera 1 and the head region of the user.

The fourth determination method is a method of determining that the simple calibration processing is to be performed when wearing of the camera 1 by the user is sensed. When the user removes the camera 1 and wears the camera 1 again, it may be possible that the positional relationship between the camera 1 and the head region of the user is changed. Accordingly, upon sensing of the wearing of the camera 1 by the user, the control unit 101 notifies the user to perform the simple calibration processing.

By sensing, e.g., connection of the connection portion 80 to the photographing/detection unit 10, the control unit 101 can sense the wearing of the camera 1 by the user. Alternatively, the control unit 101 may also determine the wearing of the camera 1 by the user when the angle of the photographing/detection unit 10 is adjusted using the angle adjustment buttons 85L and 85R. Still alternatively, the control unit 101 may also determine the wearing of the camera 1 by the user when the lengths of the band portions 82L and 82R are adjusted using the adjustment buttons 92L and 92R. When the user wears the camera 1, by encouraging the user to perform the simple calibration processing, the camera 1 can timely adjust the displacement of the recording region.

The fifth determination method is a method of determining that the simple calibration processing is to be performed when an amount of change of a measurement value from the distance measurement sensor 111 per unit time becomes equal to or more than a predetermined threshold. The distance measurement sensor 111 is, e.g., a ToF sensor, and measures the distance to the subject. When the amount of change of the distance to the subject per unit time increases, due to a change in the positional relationship between the camera 1 and the subject, the recording region intended by the user may not be imaged.

Accordingly, when the amount of change of the measurement value from the distance measurement sensor 111 per unit time becomes equal to or more than the predetermined threshold, the control unit 101 notifies the user to perform the simple calibration processing. When the positional relationship with the subject is changed, by encouraging the user to perform the simple calibration processing, the camera 1 can timely adjust the displacement of the recording region.

The sixth determination method is a method of determining that the simple calibration processing is to be performed when the touch sensor 112 that senses a state of contact with the user during wearing senses a change in the state of contact with the user. The touch sensor 112 is provided in, e.g., a surface of the photographing/detection unit 10 to be brought into contact with the user. For example, when the user forwardly inclines his or her upper body and the photographing/detection unit 10 is thereby separated from the body of the user, the touch sensor 112 no longer senses the contact with the user. In other words, the positional relationship between the camera 1 and the head region of the user is changed.

Accordingly, when the touch sensor 112 senses a change in the state of contact with the user, the control unit 101 notifies the user to perform the simple calibration processing. When the positional relationship with the head region of the user is changed, the camera 1 encourages the user to perform the simple calibration processing, and can thereby timely adjust the displacement of the recording region.

Thus, the control unit 101 can determine whether or not the simple calibration processing is to be performed by using the various determination methods. These determination methods can optionally be combined and used appropriately. The control unit 101 may determine that the simple calibration processing is to be performed when conditions are satisfied by any of the determination methods or may also determine that the simple calibration processing is to be performed when conditions are satisfied by a plurality of the determination methods. Alternatively, the control unit 101 may also adopt, as the method of determining whether or not the simple calibration processing is to be performed, all or any of the six determination methods described by way of example. When it is determined in S1520 that the simple calibration processing is to be performed, the processing advances to S1521.

The processing in S1521 to S1523 is processing of checking whether or not the amount of deviation of the recording region is less than the predetermined threshold in the same manner as in the first determination method. When it is determined in S1520 whether or not the simple calibration processing is to be performed by using the first determination method, the processing in S1521 to S1523 is omitted. When it is determined in S1520 whether or not the simple calibration processing is to be performed by using any method other than the first determination method, the processing in S1521 to S1523 may be either performed or omitted.

In S1521 in FIG. 15, the control unit 101 acquires the information on the inclination of the camera 1 and the head region posture of the user at present. In S1522, the control unit 101 acquires, from the information acquired in S1521, the amount of deviation between the current recording region and the recording region assumed from settings in the calibration processing.

In S1523, the control unit 101 determines whether or not the amount of deviation acquired in S1522 is less than the predetermined threshold. When the amount of deviation is less than the predetermined threshold, the processing returns to S1500, and the camera 1 returns to the photographing instruction standby state. When the amount of deviation is equal to or more than the predetermined threshold, the processing advances to S1524.

In S1524, the control unit 101 transmits a notification that encourages performance of the simple calibration processing to the display device 700. In S1525, the control unit 101 uses the display device 700 to perform the simple calibration processing. When the simple calibration processing is completed, the processing returns to S1500. The camera 1 enters the photographing instruction standby state.

Note that FIG. 15 illustrates an example in which the calibration processing is performed not during the image recording, but during the standby of the photographing instruction, but the control unit 101 may also determine whether or not the simple calibration processing is to be performed during the image recording in the same manner as in S1520.

FIG. 17 is a flow chart illustrating an example of the simple calibration processing in the display device 700. The processing illustrated in FIG. 17 is started upon receipt of the notification that promotes the simple calibration processing in S1524 from the camera 1 by the display device 700.

In S1700, the control unit 701 of the display device 700 determines whether or not the display device 700 is connected to the camera 1. When the display device 700 is already connected to the camera 1 or when the connection is confirmed after standby until the connection to the camera 1, the control unit 701 advances to S1701.

Note that the control unit 701 may also present the notification that promotes the simple calibration processing to the user via a message, an icon, or the like. The user can check the notification and activate the app (simple calibration checking app) for performing the simple calibration. The simple calibration checking app may also be implemented as the same application as the app for the standard calibration.

In S1701, the control unit 701 determines whether or not the simple calibration checking app is activated. The control unit 701 stands by until the simple calibration checking app is activated, and advances to S1702. The simple calibration checking app is not limited to a case where the simple calibration checking app is activated by an operation by the user, and may also be automatically activated when the control unit 701 of the display device 700 receives the notification that promotes the simple calibration processing from the camera 1.

In Step S1702, the control unit 701 acquires, from the camera 1, the information related to the displacement of the recording region. The displacement of the recording region is caused by deviation of the head region posture (face direction). Therefore, the information related to the displacement of the recording region can be the head region posture information when the calibration processing is performed and information acquired on the basis of the current head region posture information.

When the user changes the position of the camera 1 to change the inclination of the camera 1, the control unit 101 of the camera 1 acquires the information related to the displacement of the recording region again. The control unit 101 transmits the information related to the displacement of the recording region acquired again to the display device 700.

In S1703, the control unit 701 displays the information related to the displacement of the recording region on the display portion 703. As illustrated in, e.g., FIG. 8A, the control unit 701 displays a checking image including an image of the head region at an angle changed on the basis of the amount of deviation and arrows in the three axis directions indicating the current face direction.

When the user changes the position of the camera 1 and receives the information related to the displacement of the recording region acquired again by the camera 1, the control unit 701 updates details of display on the display portion 703 on the basis of the received information. The user adjusts the worn position of the camera 1 on the basis of the displacement information displayed on the display portion 703 to correct calibration deviation.

In S1704, the control unit 701 determines whether or not the simple calibration processing is ended. The simple calibration processing is ended when there is substantially no amount of deviation or when the simple calibration checking app is ended. The simple calibration checking app may be ended by an operation by the user, or may also be ended by the control unit 701 when there is substantially no amount of deviation.

When the simple calibration processing is not ended, the control unit 701 returns to S1702, and stands by until the information related to the displacement of the recording region is transmitted from the camera 1. When the simple calibration processing is ended, the control unit 701 notifies the camera 1 that the simple calibration processing is ended, and the simple calibration processing in the display device 700 is ended.

Figure 18:
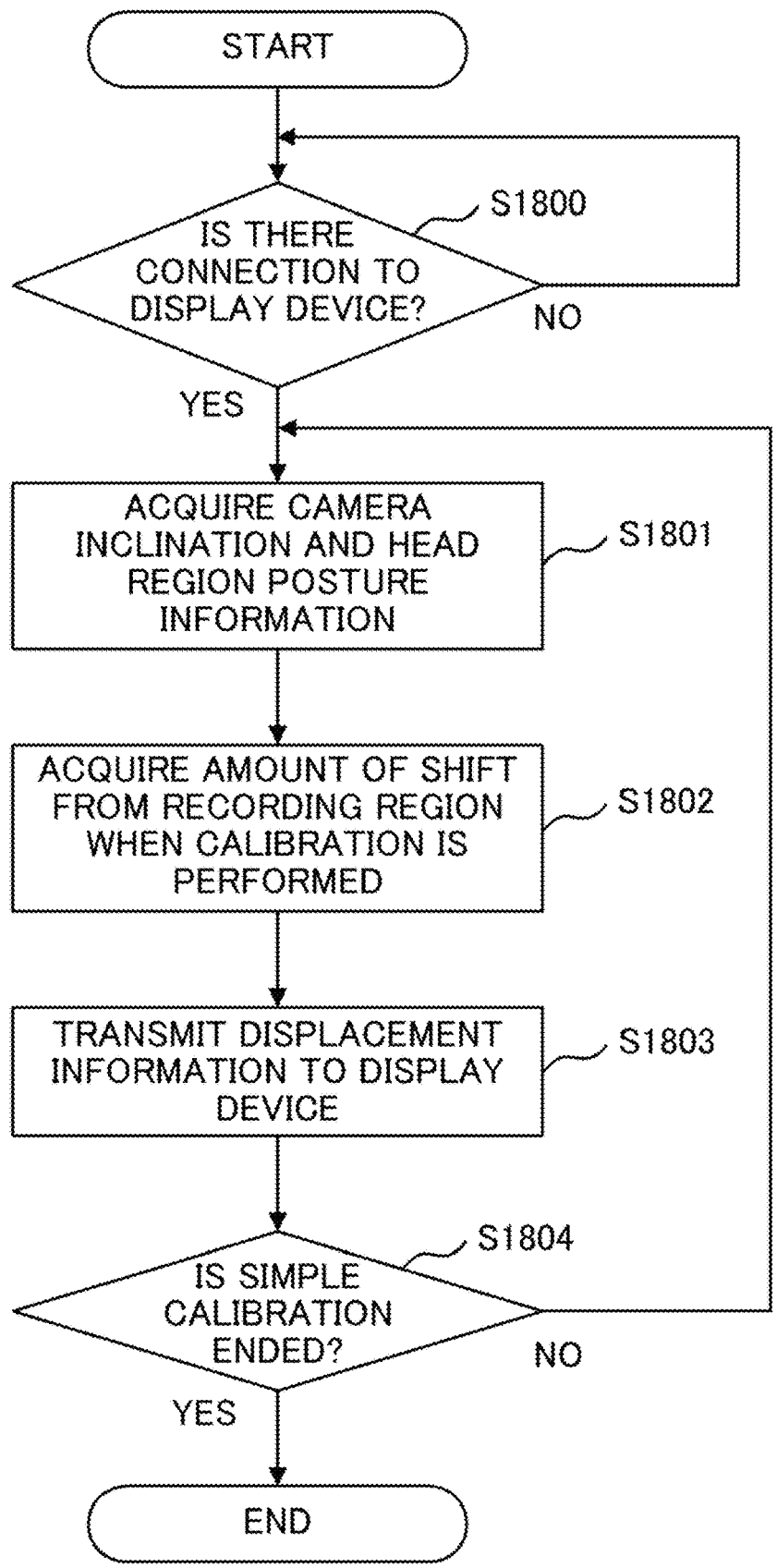
FIG. 18 is a flow chart of the simple calibration processing in the camera.

FIG. 18 is a flow chart illustrating an example of the simple calibration processing in the camera 1. The simple calibration processing illustrated in FIG. 18 details processing on the camera 1 side in S1525 in FIG. 15. The simple calibration processing is performed by the user by adjusting the worn position of the camera 1 while viewing a checking screen on the display device 700. The simple calibration processing in the camera 1 illustrated in FIG. 18 is started in S1524 in FIG. 15 by the control unit 101 of the camera 1 by transmitting a notification that encourages the performance of the simple calibration processing to the display device 700.

In S1800, the control unit 101 of the camera 1 determines whether or not the camera 1 is connected to the display device 700. When the camera 1 is already connected to the display device 700 or when the connection is confirmed after standby until the connection to the display device 700, the control unit 101 advances to S1801.

In S1801, the control unit 101 receives a request to acquire the recording region displacement information from the display device 700 (S1702 in FIG. 17), and acquires the information on the inclination of the camera 1 and the head region posture.

In S1802, the control unit 101 acquires the amount of shift of the recording region on the basis of each of the information on the inclination of the camera 1 and the head region posture when the calibration processing is performed and information on the current inclination of the camera 1 and the current head region posture acquired in S1801.

In S1803, the control unit 101 generates the information related to the displacement of the recording region on the basis of the amount of shift acquired in S1802, and transmits the information to the display device 700. The information related to the displacement of the recording region is generated as, e.g., information on an amount of deviation of the head region posture.

In S1804, the control unit 101 determines whether or not the simple calibration processing is ended. The control unit 101 receives, from the display device 700, a notification of ending of the simple calibration processing to be able to determine that the simple calibration processing is ended. When the simple calibration processing is not ended, the processing returns to S1801. The control unit 101 repeats the processing of transmitting the displacement information to the display device 700 until the simple calibration processing is ended. When the simple calibration processing is ended, the processing returns to S1500 in FIG. 15, and the camera 1 is brought into the standby state.

According to the embodiment described above, after the standard calibration processing is performed, when the worn state of the camera 1 is changed, it is possible to encourage the user to perform the simple calibration processing. When the worn state of the camera 1 is changed, the user can avoid performing photographing without noticing the displacement of the recording region. In addition, the user can perform the calibration processing by an operation simpler than that for the standard calibration and adjust the displacement of the recording region.

While the description has been given heretofore of the preferred embodiments of the present invention, the present invention is not limited to these embodiments, and can variously been modified and changed within the scope of the gist thereof.

According to the present disclosure, it is possible to reduce deviation in calibration settings.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-040654, filed on Mar. 15, 2022, which is hereby incorporated by reference herein in its entirety.

What is claimed is:

1. An imaging apparatus comprising at least one memory and at least one processor which function as:
    an imaging unit;
    a detection unit configured to detect a posture of a head region of a user with respect to the imaging apparatus;
    a decision unit configured to decide, on the basis of the posture of the head region detected by the detection unit, a recording region to be clipped from an imaging range of an image acquired by the imaging unit;
    a determination unit configured to determine whether or not a displacement of the recording region in the imaging range of the image is to be adjusted; and
    a notification unit configured to transmit, in a case where it is determined by the determination unit that the displacement of the recording region is to be adjusted, a notification that encourages the adjustment of the displacement of the recording region to a display device that displays information related to the displacement of the recording region.

2. The imaging apparatus according to claim 1,
    wherein the determination unit determines that the displacement of the recording region is to be adjusted in a case where an amount of deviation between a position of the recording region in the imaging range when calibration processing of adjusting the position of the recording region according to the user is performed and a current position of the recording region becomes equal to or more than a predetermined threshold.

3. The imaging apparatus according to claim 1,
    wherein the determination unit determines that the displacement of the recording region is to be adjusted in a case where an amount of deviation between an inclination of the imaging apparatus when calibration processing of adjusting a position of the recording region in the imaging range according to the user is performed and a current inclination of the imaging apparatus becomes equal to or more than a predetermined threshold.

4. The imaging apparatus according to claim 1, wherein the determination unit determines that the displacement of the recording region is to be adjusted in a case where an amount of deviation between a posture of the head region when calibration processing of adjusting a position of the recording region in the imaging range according to the user is performed and a current posture of the head region of the user becomes equal to or more than a predetermined threshold.

5. The imaging apparatus according to claim 1, wherein the determination unit determines that the displacement of the recording region is to be adjusted upon sensing of wearing of the imaging apparatus by the user.

6. The imaging apparatus according to claim 1, further comprising:
a distance measurement sensor that measures a distance to a subject,
wherein the determination unit determines that the displacement of the recording region is to be adjusted in a case where an amount of change in a measurement value from the distance measurement sensor per unit time becomes equal to or more than a predetermined threshold.

7. The imaging apparatus according to claim 1, further comprising:
a touch sensor that senses a state of contact with the user during wearing of the imaging apparatus by the user,
wherein the determination unit determines that the displacement of the recording region is to be adjusted in a case where the touch sensor senses a change in the state of contact with the user.

8. The imaging apparatus according to claim 1, wherein the notification unit transmits, to the display device, information related to the displacement of the recording region acquired on the basis of each of information on a posture of the head region when calibration processing of adjusting a position of the recording region in the imaging range according to the user is performed and information on a current posture of the head region detected by the detection unit.

9. The imaging apparatus according to claim 8, wherein, when an inclination of the imaging apparatus changes, the notification unit acquires the information related to the displacement of the recording region again and transmits the information acquired again to the display device.

10. The imaging apparatus according to claim 8, wherein the information on the posture of the head region is represented by angles in three axis directions.

11. A display device that receives the notification from the imaging apparatus according to claim 1, the display device comprising at least one memory and at least one processor which function as:
a display control unit configured to present the notification to the user and display the information related to the displacement of the recording region.

12. The display device according to claim 11, wherein the display control unit receives information related to the displacement of the recording region acquired on the basis of each of information on a posture of the head region when calibration processing of adjusting a position of the recording region in the imaging range according to the user is performed and information on a current posture of the head region detected by the detection unit, and displays a checking image for adjusting the displacement.

13. The display device according to claim 12, wherein, when an inclination of the imaging apparatus changes, the display control unit receives the information related to the displacement of the recording region acquired again in the imaging apparatus, and updates the checking image.

14. The display device according to claim 12, wherein the checking image is a three-dimensional image.

15. The display device according to claim 11, wherein, when receiving the notification, the display control unit activates an application for adjusting the displacement of the recording region.

16. The imaging apparatus according to claim 1, wherein the display device is configured to display information related to the displacement of the recording region and to perform a calibration processing of adjusting the position of the recording region.

17. The imaging apparatus according to claim 1, wherein the displacement of the recording region in the imaging range is to be adjusted based on an amount of deviation between the posture of the head region detected by the detection unit and a posture of the head region when a calibration processing is performed.

18. A control method of an imaging apparatus including an imaging unit, the control method comprising:
a detection step of detecting a posture of a head region of a user with respect to the imaging apparatus;
a decision step of deciding, on the basis of the posture of the head region detected in the detection step, a recording region to be clipped from an imaging range of an image acquired by the imaging unit;
a determination step of determining whether or not a displacement of the recording region in the imaging range of the image is to be adjusted; and
a notification step of transmitting, in a case where it is determined in the determination step that the displacement of the recording region is to be adjusted, a notification that encourages the adjustment of the displacement of the recording region to a display device that displays information related to the displacement of the recording region.

19. A non-transitory computer-readable medium that stores a program for causing a computer to execute a control method of an imaging apparatus including an imaging unit, the control method comprising:
a detection step of detecting a posture of a head region of a user with respect to the imaging apparatus;
a decision step of deciding, on the basis of the posture of the head region detected in the detection step, a recording region to be clipped from an imaging range of an image acquired by the imaging unit;
a determination step of determining whether or not a displacement of the recording region in the imaging range of the image is to be adjusted; and
a notification step of transmitting, in a case where it is determined in the determination step that the displacement of the recording region is to be adjusted, a notification that encourages the adjustment of the displacement of the recording region to a display device that displays information related to the displacement of the recording region.

20. An imaging system comprising an imaging apparatus and a display device,
the imaging apparatus comprising at least one memory and at least one processor which function as:
an imaging unit;
a detection unit configured to detect a posture of a head region of a user with respect to the imaging apparatus;
a decision unit configured to decide, on the basis of the posture of the head region detected by the detection unit, a recording region to be clipped from an imaging range of an image acquired by the imaging unit;
a determination unit configured to determine whether or not a displacement of the recording region in the imaging range of the image is to be adjusted; and
a notification unit configured to transmit, in a case where it is determined by the determination unit that the displacement of the recording region is to be adjusted, a notification that encourages the adjustment of the displacement of the recording region to the display device, the display device comprising at least one memory and at least one processor which function as:
a display control unit that presents the notification to the user and displays information related to the displacement of the recording region.

\* \* \* \* \*